(12) United States Patent
Loianno et al.

(10) Patent No.: US 10,037,028 B2
(45) Date of Patent: Jul. 31, 2018

(54) SYSTEMS, DEVICES, AND METHODS FOR ON-BOARD SENSING AND CONTROL OF MICRO AERIAL VEHICLES

(71) Applicant: The Trustees of the University of Pennsylvania, Philadelphia, PA (US)

(72) Inventors: Giuseppe Loianno, Philadelphia, PA (US); Yash Shailesh Mulgaonkar, Philadelphia, PA (US); R. Vijay Kumar, Wilmington, DE (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 15/218,938

(22) Filed: Jul. 25, 2016

(65) Prior Publication Data

US 2017/0023937 A1 Jan. 26, 2017

Related U.S. Application Data

(60) Provisional application No. 62/196,762, filed on Jul. 24, 2015.

(51) Int. Cl.
*G05D 1/00* (2006.01)
*G05D 1/08* (2006.01)
(Continued)

(52) U.S. Cl.
CPC .......... *G05D 1/0011* (2013.01); *B64C 39/024* (2013.01); *G01C 21/165* (2013.01);
(Continued)

(58) Field of Classification Search
CPC combination set(s) only.
See application file for complete search history.

(56) References Cited

U.S. PATENT DOCUMENTS

| 642,258 | A | 1/1900 | Robken |
| 5,414,631 | A | 5/1995 | Denoize et al. |

(Continued)

FOREIGN PATENT DOCUMENTS

| AU | 2013293507 B2 | 3/2017 |
| CN | 104718508 B | 9/2017 |

(Continued)

OTHER PUBLICATIONS

Notification of First Office Action for Chinese Patent Application No. 201380034947.8 (dated Jun. 3, 2016).
(Continued)

*Primary Examiner* — Hussein Elchanti
(74) *Attorney, Agent, or Firm* — Jenkins, Wilson, Taylor & Hunt, P.A.

(57) ABSTRACT

Systems, devices, and methods for on-board sensing and control of robotic vehicles (e.g., MAVs) using commercial off-the-shelf hand-held electronic devices as a sensing and control system are provided. In one aspect, a system for controlling a micro aerial vehicle may include one or more sensors, a state estimation module in communication with the one or more sensors, the state estimation module being configured to generate an estimated pose of the micro aerial vehicle based on inputs from the one or more sensors, and a position controller in communication with the state estimation module and configured to communicate attitude commands to an attitude controller of the micro aerial vehicle. Each of the one or more sensors, the state estimation module, and the position controller may be contained in a commercial off-the-shelf hand-held electronic device that is configured to be coupled to the micro aerial vehicle.

14 Claims, 12 Drawing Sheets

(51) Int. Cl.
    G08G 5/00      (2006.01)
    B64C 39/02     (2006.01)
    G01C 21/16     (2006.01)
    G01C 21/20     (2006.01)
(52) U.S. Cl.
    CPC ......... *G01C 21/206* (2013.01); *G05D 1/0038*
        (2013.01); *G05D 1/0088* (2013.01); *G05D*
        *1/0808* (2013.01); *G08G 5/003* (2013.01);
        *B64C 2201/108* (2013.01); *B64C 2201/141*
        (2013.01); *B64C 2201/146* (2013.01)

(56) References Cited

U.S. PATENT DOCUMENTS

| | | |
|---|---|---|
| 6,278,945 B1 | 8/2001 | Lin |
| 6,308,911 B1 | 10/2001 | Schroeder |
| 6,422,508 B1 | 7/2002 | Barnes |
| 7,249,730 B1 | 7/2007 | Flippen, Jr. |
| 7,289,906 B2 | 10/2007 | van der Merwe et al. |
| 8,019,544 B2 | 9/2011 | Needelman et al. |
| 8,380,362 B2 | 2/2013 | Beavin |
| 8,577,539 B1 | 11/2013 | Morrison et al. |
| 8,676,498 B2 | 3/2014 | Ma et al. |
| 8,756,001 B2 | 6/2014 | Georgy et al. |
| 9,031,809 B1 | 5/2015 | Kumar et al. |
| 9,104,201 B1 | 8/2015 | Pillai et al. |
| 9,488,480 B2 | 11/2016 | Georgy et al. |
| 9,568,321 B2 | 2/2017 | Bharadwaj et al. |
| 9,599,993 B2 | 3/2017 | Kumar et al. |
| 2003/0182077 A1 | 9/2003 | Emord |
| 2004/0264761 A1 | 12/2004 | Mas et al. |
| 2005/0251328 A1 | 11/2005 | Merwe et al. |
| 2006/0015247 A1 | 1/2006 | Speer |
| 2007/0032951 A1 | 2/2007 | Tanenhaus et al. |
| 2007/0235592 A1 | 10/2007 | Horn et al. |
| 2008/0125896 A1 | 5/2008 | Troy et al. |
| 2008/0195316 A1 | 8/2008 | Krishnaswamy |
| 2009/0256909 A1 | 10/2009 | Nixon |
| 2009/0290811 A1 | 11/2009 | Imai |
| 2010/0084513 A1 | 4/2010 | Gariepy et al. |
| 2010/0114408 A1 | 5/2010 | Goossen |
| 2011/0029235 A1 | 2/2011 | Berry |
| 2011/0082566 A1 | 4/2011 | Herr et al. |
| 2012/0078510 A1 | 3/2012 | Ma et al. |
| 2012/0101861 A1 | 4/2012 | Lindores |
| 2012/0203519 A1 | 8/2012 | Louis et al. |
| 2012/0221244 A1 | 8/2012 | Georgy et al. |
| 2012/0245844 A1 | 9/2012 | Lommel et al. |
| 2012/0256730 A1 | 10/2012 | Scott et al. |
| 2012/0286991 A1 | 11/2012 | Chen et al. |
| 2013/0124020 A1 | 5/2013 | Duggan et al. |
| 2013/0131908 A1 | 5/2013 | Trepagnier et al. |
| 2013/0176423 A1* | 7/2013 | Rischmuller ........ G05D 1/0038 348/114 |
| 2013/0325346 A1 | 12/2013 | McPeek |
| 2014/0008496 A1* | 1/2014 | Ye ........................... B64C 13/20 244/190 |
| 2014/0032167 A1 | 1/2014 | Mayer et al. |
| 2014/0099853 A1* | 4/2014 | Condon ................. A63H 30/04 446/37 |
| 2014/0138477 A1* | 5/2014 | Keennon ................. B64C 27/12 244/17.23 |
| 2014/0152837 A1 | 6/2014 | Menon |
| 2014/0152839 A1 | 6/2014 | Menon |
| 2014/0277847 A1* | 9/2014 | Cann ........................ B25J 5/007 701/2 |
| 2014/0278029 A1 | 9/2014 | Tonguz et al. |
| 2014/0324253 A1 | 10/2014 | Duggan et al. |
| 2014/0372026 A1 | 12/2014 | Georgy et al. |
| 2015/0025713 A1 | 1/2015 | Klinger et al. |
| 2015/0039220 A1 | 2/2015 | Georgy et al. |
| 2015/0149000 A1* | 5/2015 | Rischmuller ......... B64C 39/024 701/7 |
| 2015/0304634 A1 | 10/2015 | Karvounis |
| 2015/0321758 A1* | 11/2015 | Sarna, II ............... B64C 39/024 244/63 |
| 2016/0132052 A1* | 5/2016 | Seydoux .............. G05D 1/0022 701/2 |
| 2016/0139596 A1* | 5/2016 | Na ........................ B64C 39/024 701/2 |
| 2016/0200438 A1* | 7/2016 | Bokeno .................... B64D 1/08 244/2 |
| 2016/0209236 A1 | 7/2016 | Steinhardt |
| 2016/0214713 A1* | 7/2016 | Cragg .................. B64C 39/024 |
| 2016/0214715 A1* | 7/2016 | Meffert ................ B64C 39/024 |
| 2016/0216119 A1 | 7/2016 | Omr et al. |
| 2017/0212529 A1 | 7/2017 | Kumar et al. |
| 2017/0372137 A1 | 12/2017 | Kumar et al. |
| 2018/0088597 A1 | 3/2018 | Shen |

FOREIGN PATENT DOCUMENTS

| | | |
|---|---|---|
| WO | WO 2014/018147 A2 | 1/2014 |
| WO | WO 2015/105597 A2 | 7/2015 |
| WO | WO 2016/123201 A1 | 8/2016 |
| WO | WO 2017/095493 A2 | 6/2017 |

OTHER PUBLICATIONS

European Search Report and Opinion for EP Application No. 13 823 648.4 (dated May 23, 2016).
Notification of Transmittal of the International Search Report and the Written Opinion of the International Search Authority, of the Declaration for International Application No. PCT/US2016/015093 (dated May 19, 2016).
Non-Final Office Action for U.S. Appl. No. 14/397,761 (dated Mar. 28, 2016).
Official Office Action for Australian Application No. 2013293507 (dated Feb. 4, 2016).
Commonly assigned, co-pending PCT International Patent Application No. PCT/US2016/015093 titled, "Systems, Devices, and Methods for Robotic Remote Sensing for Precision Agriculture," (unpublished, filed Jan. 27, 2016).
Wagner et al., "Subdimensional expansion for multirobot path planning," Artificial Intelligence, vol. 219, pp. 1-24, (2015).
Commonly assigned, co-pending U.S. Appl. No. 62/217,301 titled, "Systems and Methods for Generating Safe Trajectories for Multi-Vehicle Teams," (unpublished, filed Sep. 11, 2015).
Notification of Transmittal of the International Search Report and the Written Opinion of the International Searching Authority, or the Declaration for International Application No. PCT/US2014/067822 (dated Aug. 7, 2015).
Commonly assigned, co-pending U.S. Appl. No. 62/196,762 titled, "Systems, Devices, and Methods for On-Board Sensing and Control of Micro Aerial Vehicles,"(unpublished, filed Jul. 24, 2015).
Communication of European publication number and information on the application of Article 67 (3) EPC for Application No. 13823648.4 (dated Feb. 11, 2015).
Shen et al., "Tightly-coupled monocular visual-inertial fusion for autonomous flight of rotorcraft MAVs," IEEE Intl. Conf. on Robot. and Autom., Seattle, Washington, USA (2015).
Goldenberg et al., Enhanced partial expansion A, Journal of Artificial Intelligence Research, vol. 50, No. 1, pp. 141-187 (2014).
Notification of Transmittal of the International Search Report and the Written Opinion of the International Searching Authority, of the Declartaoin for International Application No. PCT/US2013/038769 (dated Jan. 17, 2014).
Hesch et al., "Camera-imu-based localization: Observability analysis and consistency improvement," The Intl. Journal of Robotics Research, vol. 33, No. 1, pp. 182-201 (2014).
Thomas et al., "Toward Image Based Visual Servoing for Aerial Grasping and Perching," IEEE Intl. Conf. on Robot. and Autom., Hong Kong, China, pp. 2113-2118 (2014).
Specht E., "The best known packings of equal circles in a square," http://hydra.nat.uni-magdeburg.de/packing/csq/csq.html (Oct. 2013).

(56) References Cited

OTHER PUBLICATIONS

Yu et al., "Planning optimal paths for multiple robots on graphs," in Proceedings of 2014 IEEE International Conference on Robotics and Automation (ICRA), pp. 3612-3617, (2013).
Martinelli, "Visual-inertial structure from motion: Observability and resolvability," IEEE/RSJ Intl. Conf. on Intell. Robots and Systems (IROS 2013), pp. 4235-4242 (Nov. 2013).
Schmid et al., "Stereo vision based indoor/outdoor navigation for flying robots," Proc. of the IEEE/RSJ Intl. Cozzi: on Intell. Robots and Syst., Tokyo, Japan, pp. 1-8 (Nov. 2013).
Lynen et al., "A robust and modular multi-sensor fusion approach applied to MAV navigation," Proc. of the IEEE/RSJ Intl. Conf. on Intell. Robots and Syst., Tokyo, Japan, pp. 1-7 (Nov. 2013).
"Kalman filter," Wikipedia, pp. 1-31 http://en.wikipedia.org/wiki/Kalman_filter (page last modified May 24, 2016).
Richter et al., "Polynomial trajectory planning for quadrotor flight," Proc. of the IEEE Intl. Conf on Robot. and Autom., Karlsruhe, Germany, pp. 1-8 (May 2013).
de Wilde et al., "Push and Rotate: Cooperative Multi-Agent Path Planning," Proceedings of the 2013 International Conference on Autonomous Agents and Multi-agent Systems (AAMAS), p. 87-94 (2013).
Turpin et al., "CAPT: Concurrent assignment and planning of trajectories for multiple robots," The International Journal of Robotics Research 2014, vol. 33(1) p. 98-112 (2013).
Shen et al., "Vision-based state estimation and trajectory control towards high-speed flight with a quadrotor," Proc. of Robot.: Sci. and Syst., Berlin, Germany, pp. 1-8 (May 2013).
Shen et al., "Vision-based state estimation for autonomous rotorcraft MAVs in complex environments," Proc. of the IEEE Intl. Conf. on Robot. And Autom., Karlsruhe, Germany, pp. 1-7 (May 2013).
Li et al., "Real-time motion tracking on a cellphone using inertial sensing and a roller-shutter camers," IEEE International Conference on Robotics and Automation, pp. 4712-4719 (May 2013).
Lee et al., "Nonlinear Robust Tracking Control of a Quadrotor UAV on SE(3)," Asian Journal of Control, vol. 15, No. 2, pp. 391-408 (May 2013).
Ozaslan et al., "Inspection of Penstocks and Featureless Tunnel-like Environments using Micro UAVs" Field and Service Robotics Conference (FSR), Brisbane, Australia, pp. 123-136 (2013).
Schmid et al., "Towards autonomous MAV exploration in cluttered indoor and outdoor environments," RSS 2013 Workshop on Resource-Eficient Integration of Perception, Control and Navigation for Micro Air Vehicles (MAVs), Berlin, Germany (2013).
Sucan et al., "The Open Motion Planning Library," IEEE Robot. Autom. Mag., vol. 19, No. 4, pp. 72-82 http://ompl.kavrakilab.org (Dec. 2012).
Fraundorfer et al., "Vision-based autonomous mapping and exploration using a quadrotor MAV," Proc. of the IEEE/RSJ Intl. Conf. on bztell. Robots and Syst., Vilamoura, Algarve, Portugal, pp. 1-8 (Oct. 2012).
Scherer et al., "River mapping from a flying robot: state estimation, river detection, and obstacle mapping," Auton. Robots, vol. 33, No. 1-2, pp. 189-214 (Aug. 2012).
Kottas et al., "On the consistency of vision-aided inertial navigation," Proc. of the Intl. Sym. on Exp. Robot., Quebec, Canada, pp. 1-15 (Jun. 2012).
Weiss et al., "Real-time onboard visual-inertial state estimation and self-calibration of mays in unknown environments," Proc. of the IEEE Intl. Conf. on Robot. and Autom., Saint Paul, MN, pp. 957-964 (May 2012).
de Croon et al., "Sub-sampling: Real-time vision for micro air vehicles," Robot. and Autom. Syst., vol. 60, No. 2, pp. 167-181 (Feb. 2012).
Turpin et al., "Trajectory design and control for aggressive formation flight with quadrotors," Autonomous Robots, vol. 33, pp. 143-156 (Feb. 2012).
Forte et al., "Impedance Control of an Aerial Manipulator," American Control Conference (ACC), Montreal, Canada, pp. 3839-3844 (2012).
Michael et al., "Collaborative mapping of an earthquake-damaged building via ground and aerial robots," Journal of Field Robotics, vol. 29, No. 5, pp. 832-841 (2012).
Shen et al., "Autonomous indoor 3D exploration with a Micro-Aerial Vehicle," IEEE Intl. Conf. on Robot. and Autom., St. Paul, Minnesota, USA, pp. 9-15 (2012).
Tomic et al., "Toward a Fully Autonomous UAV: Research platform for indoor and outdoor urban search and rescue," IEEE Robot. Autom. Mag., vol. 19, No. 3, pp. 46-56 (2012).
Kushleyev et al., "Planning for landing site selection in the aerial supply delivery," Proc. of the IEEE/RSJ Intl. Conf on Intell. Robots and Syst., San Francisco, CA, pp. 1146-1153 (Sep. 2011).
Michael et al., "Control of ensembles of aerial robots," Proc. of the IEEE, vol. 99, No. 9, pp. 1587-1602 (Sep. 2011).
Huang et al., "Visual odometry and mapping for autonomous flight using an RGB-D camera," Proc. of the Intl. Spit. of Robot. Research, Flagstaff, AZ, pp. 1-16 (Aug. 2011).
Bills et al., "Autonomous MAV flight in indoor environments using single image perspective cues," Proc. of the IEEE Intl. Conf. on Robot, and Autom., Shanghai, China, pp. 5776-5783 (May 2011).
Mellinger et al., "Minimum Snap Trajectory Generation and Control for Quadrotors," IEEE International Conference on Robotics and Automation, pp. 2520-2525 (May 2011).
Kuemmerle et al., "g2o: A general framework for graph optimization," Proc. of the IEEE Intl. Conf. on Robot. and Autom., Shanghai, China, pp. 3607-3613 (May 2011).
Shen et al., "Autonomous multi-floor indoor navigation with a computationally constrained MAV," Proc. of the IEEE Intl. Conf on Robot. and Autom., Shanghai, China, pp. 20-25 (May 2011).
De Vries et al., "Cooperative Control of Swarms of Unmanned Aerial Vehicles," 49th AIAA Aerospace Sciences Meeting Including the New Horizons Forum and Aerospace Exposition, pp. 1-23 (Jan. 2011).
Jones et al., "Visual-inertial navigation, mapping and localization: A scalable real-time causal approach," International Journal of Robotics Research, pp. 1-38 (Jan. 2011).
Michael et al., "Cooperative manipulation and transportation with aerial robots," Auton. Robots, vol. 30, No. 1, pp. 73-86 (Jan. 2011).
Grzonka et al., "A fully autonomous indoor quadrotor," IEEE Trans. Robot., vol. PP, No. 99, pp. 1-11 (2011).
Bachrach et al., "RANGE-robust autonomous navigation in GPS-denied environments," J. Field Robotics, vol. 28, No. 5, pp. 644-666 (2011).
Weiss et al., "Monocular-SLAM-based navigation for autonomous micro helicopters in GPS denied environments," Journal of Field Robotics, vol. 28, No. 6, pp. 854-874 (2011).
Lee et al., "Geometric tracking control of a quadrotor UAV on SE(3)," Proc. of the Intl. Conf. on Decision and Control, Atlanta, GA, pp. 5420-5425 (Dec. 2010).
Mellinger et al., "Trajectory generation and control for precise aggressive maneuvers," Intl. Symposium on Experimental Robotics (Dec. 2010).
Alonso-Mora et al., "Optimal reciprocal collision avoidance for multiple non-holonomic robots," Proceedings of the 10th International Symposium on Distributed Autonomous Robotic Systems (DARS), Berlin, Springer Press (Nov. 2010).
Mellinger et al., "Cooperative grasping and transport using multiple quadrotors," Intl. Symposium on Distributed Autonomous Systems, Lausanne, Switzerland (Nov. 2010).
Michael et al., "The Grasp Multiple Micro UAV TestBed," IEEE Robotics and Automation Magazine, vol. 17, No. 3, pp. 56-65 (Sep. 2010).
Kelly et al., "Visual-inertial sensor fusion: Localization, mapping and sensor-to-sensor self-calibration," pp. 1-53 (Aug. 2010).
Carlson, "Mapping large urban environments with GPS-aided SLAM," Ph.D. dissertation, CMU, Pittsburgh, PA, pp. 1-122 (Jul. 2010).
Mei et al., "RSLAM: A system for large-scale mapping in constant-time using stereo," Intl J. of Computer Vision, pp. 1-17 (Jun. 2010).

(56) References Cited

OTHER PUBLICATIONS

Strasdat et al., "Scale drift-aware large scale monocular SLAM," Proc. of Robot.: Sci. and Syst., Zaragoza, Spain, pp. 1-8 (Jun. 2010).
Karaman et al., "Incremental sampling-based algorithms for optimal motion planning," Proc. of Robot.: Sci. and Syst., Zaragoza, Spain pp. 1-8 (Jun. 2010).
Gillula et al., "Design of guaranteed safe maneuvers using reachable sets: Autonomous quadrotor aerobatics in theory and practice," Proc. of the IEEE Intl. Conf. on Robotics and Automation, pp. 1649-1654, Anchorage, AK (May 2010).
Lupashin et al., "A simple learning strategy for high-speed quadrocopter multi-flips," Proc. of the IEEE Intl. Conf. on Robot. and Autom., pp. 1642-1648, Anchorage, AK (May 2010).
Oung et al., "The distributed flight array," Proc. of the IEEE Intl. Conf. on Robotics and Automation, pp. 601-607, Anchorage, AK (May 2010).
He et al., "On the design and use of a micro air vehicle to track and avoid adversaries," The International Journal of Robotics Research, vol. 29, pp. 529-546 (2010).
Bachrach et al., "Autonomous flight in unknown indoor environments," International Journal of Micro Air Vehicles, vol. 1, No. 4, pp. 217-228 (Dec. 2009).
Fink et al., "Planning and control for cooperative manipulation and transportation with aerial robots," Proceedings of the Intl. Symposium of Robotics Research, Luzern, Switzerland (Aug. 2009).
Tedrake, "LQR-Trees: Feedback motion planning on sparse randomized trees," Proceedings of Robotics: Science and Systems, Seattle, WA (Jun. 2009).
Moore et al., "Simultaneous local and global state estimation for robotic navigation," Proc. of the IEEE Intl. Conf. on Robot. and Autom., Kobe, Japan, pp. 3794-3799 (May 2009).
Schleicher et al., "Real-time hierachical GPS aided visual SLAM on urban environments," Proc. of the IEEE Intl. Conf. on Robot. and Autom., Kobe, Japan, pp. 4381-4386 (May 2009).
Esme, "Kalman Filter for Dummies," Bilgin's Blog, pp. 1-15, http://bilgin.esme.org/BitsBytes/KalmanFilterforDummies.aspx (Mar. 2009).
Bullo et al., Distributed Control of Robotic Networks, A Mathematical Approach to Motion Coordination Algorithms. Applied Mathematics Series, Princeton University Press (2009).
Klien et al., "Parallel Tracking and Mapping on a Camera Phone," International Symposium on Mixed and Augmented Reality (ISMAR), pp. 1-4 (2009).
van der Berg, "Reciprocal n-body collision avoidance," International Symposium on Robotics Research p. 3-19, (2009).
van den Berg et al., "Centralized path planning for multiple robots: Optimal decoupling into sequential plans," in Proceedings of Robotics: Science and Systems (RSS), (2009).
van den Berg J., "RVO2 library documentation," http://gamma.cs.unc.edu/RVO2/documentation/2.0/index.html (2008).
Civera et al., "Inverse depth parameterization for monocular SLAM," IEEE Trans. On Robot., vol. 24, No. 5, pp. 932-945 (Oct. 2008).
Wagner et al., "Robust and Unobtrusive Marker Tracking on Mobile Phones," International Symposium on Mixed and Augmented Reality (ISMAR), pp. 1-7 (Sep. 2008).
Kaess et al., "iSAM: Incremental smoothing and mapping," IEEE Trans. on Robot., manuscript, pp. 1-14 (Sep. 2008).
Kopfstedt et al., "Control Formations of UAVs for Surveillance and Reconnaissance Missions," Proceedings of the 17th World Congress, The International Federation of Automatic Control, pp. 5161-5166 (Jul. 2008).
Olson, "Robust and efficient robotic mapping," Ph.D. dissertation, MIT, Cambridge, MA, pp. 1-10 (Jun. 2008).
Klein et al., "Parallel tracking and mapping for small AR workspaces," Proc. Sixth IEEE and ACM International Symposium on Mixed and Augmented Reality (ISMAR'07), Nara, Japan, pp. 1-10 (Nov. 2007).

Moreno-Noguer et al., "Accurate non-iterative 0(n) solution to the PnP problem," Proc. of the IEEE Intl. Conf on Computer Vision, Rio de Janeiro, Brazil, pp. 1-8 (Oct. 2007).
Tanner et al., "Flocking in fixed and switching networks," IEEE Trans. Autom. Control, vol. 52, No. 5, pp. 863-868 (May 2007).
Gurdan et al., "Energy-efficient autonomous four-rotor flying robot controlled at 1khz," Proceedings of the IEEE Intl. Conf. on Robotics and Automation, Roma, Italy (Apr. 2007).
Rosten et al., "Machine learning for high speed corner detection," Proc. of the European Conf on Computer Vision, Graz, Austria, pp. 1-14 (May 2006).
Bay et al., "SURF: Speeded up robust features," Proc. of the European Conf on Computer Vision, Graz, Austria, pp. 1-14 (May 2006).
Schouwenaars et al., "Multi-vehicle path planning for non-line of sight communications," American Control Conference (2006).
Peng er al., "Coordinating multiple robots with kinodynamic constraints along specified paths," The International Journal of Robotics Research (IJRR), vol. 24, No. 4, pp. 295-310, (2005).
Hastings et al., "Optimization of large-scale, real-tim simulations by spatial hashing," Proceedings of the 2005 Summer Computer Simulation Conference pp. 9-17 (2005).
Kamal et al., "Real Time Trajectory Planning for UAVs Using MILP," Proceedings of the 44th IEEE Conference on Decision and Control, and the European Control Conference 2005, pp. 3381-3386 (Dec. 2005).
Foxlin, "Pedestrian Tracking with Shoe-Mounted Inertial Sensors," Computer Graphics and Applications, vol. 25, No. 6, pp. 38-46 (Nov./Dec. 2005).
Schouwenaars et al., "Receding horizon path planning with implicit safety guarantees," American Control Conference, pp. 5576-5581 (2004).
Rourmeliotis et al., "Stochastic cloning: A generalized framework for processing relative state measurements," Proc. of the IEEE Intl. Conf on Robot. and Autom., Washington, DC, pp. 1788-1795 (May 2002).
Desai et al., "Modeling and control of formations of nonholonomic mobile robots," IEEE Trans. Robot., vol. 17, No. 6, pp. 905-908 (Dec. 2001).
Egerstedt et al., "Formation constrained multi-agent control," IEEE Trans. Robot. Autom., vol. 17, No. 6, pp. 947-951 (Dec. 2001).
Beard et al., "A coordination architecture for spacecraft formation control," IEEE Trans. Control Syst. Technol., vol. 9, No. 6, pp. .777-790 (Nov. 2001).
Lefebvre et al., "Comment on 'A new method for the nonlinear transformation of means and covariances in filters and estimators'," IEEE Trans. Autom. Control, vol. 47, No. 8, pp. 1-10 (2001).
Richards et al., "Plume avoidance maneuver planning using mixed integer linear programming,"AIAA Guidance, Navigation and Control Conference and Exhibit (2001).
Schouwenaars et al., "Mixed integer programming for multi-vehicle path planning," European Control Conference, pp. 2603-2608 (2001).
Welch et al., "An introduction to the Kalman Filter," SIGGRAPH 2001, Course 8, pp. 1-47 (2001).
Tomlin et al., "Conflict resolution for air traffic management: a study in multi-agent hybrid systems." IEEE Transactions on Automatic Control, vol. 43, pp. 509-521, (1998).
Nieuwstadt et al., "Real-time trajectory generation for differentially flat systems," International Journal of Robust and Nonlinear Control, vol. 8, pp. 995-1020 (1998).
Julier et al., "A new extension of the kalman filter to nonlinear systems," Proc. of SPIE, I. Kadar, Ed., vol. 3068, pp. 182-193 (Jul. 1997).
Parrish et al., Animal Groups in Three Dimensions. Cambridge University Press, New York (1997).
Welch et al., "SCAAT: Incremental Tracking with incomplete Information," University of North Carolina at Chapel Hill, pp. 1-12 (1997).
Buckley S., "Fast motion planning for multiple moving robots," Proceedings of the 1989 IEEE international Conference on Robotics and Automation (ICRA p. 322-326 (1989).

(56) References Cited

OTHER PUBLICATIONS

Smith et al., "Estimating uncertain spatial relationships in robotics," Proc. of the IEEE Intl. Conf. on Robot. and Autom., vol. 4, Raleigh, NC, pp. 167-193 (Mar. 1987).
Kant et al., "Toward efficient trajectory planning: The path-velocity decomposition," The International Journal of Robotics Research (IJRR), vol. 5, No. 3, pp. 72-89, (1986).
Erdmann et al., "On multiple moving objects," Algorithmica, vol. 2, pp. 1419-1424, (1986).
Lucas et al., "An iterative image registration technique with an application to stereo vision," Proc. of the 7th Intl. Joint Conf. on Artificial Intelligence, Vancouver, Canada, pp. 674-679 (Aug. 1981).
Maybeck, "Chapter 1 Introduction," Stochastic models, estimation, and control, vol. 1, pp. 1-16. Academic Press, Inc. (1979).
Hart et al., "A formal basis for the heuristic determination of minimum cost paths," IEEE Transactions on Systems Science and Cybernetics, vol. 4, No. 2, pp. 100-107, (Jul. 1968).
"Hummingbird quadrotor," Ascending Technologies, http://www.asctec.de/ (publication date unknown; downloaded from the internet May 25, 2016).
"Pelican quadrotor," Ascending Technologies, GmbH, http://www.asctec.de/ (publication date unknown; downloaded from the internet May 25, 2016).
Notice of Allowance and Fee(s) Due for U.S. Appl. No. 14/397,761 (dated Oct. 4, 2016).
Van der Merwe et al., "Sigma-Point Kalman Filters for Integrated Navigation," Proc. of AIAA Guidance, Navigation, and Controls Conf., pp. 1-14 (Aug. 2004).
Communication of European publication number and information on the application of Article 67(3) EPC for European Patent Application No. 14878289.9 (dated Sep. 7, 2016).
Zou et al., "CoSLAM: Collaborative visual SLAM in dynamic environments," IEEE Transactions on Pattern Analysis Machine Intelligence, vol. 35, No. 2, pp. 354-366 (2013).
Forster et al., "Collaborative monocular SLAM with multiple Micro Aerial Vehicles," IEEE/RSJ Conference on Intelligent Robots and Systems, Tokyo, Japan (2013).
Shen et al., "State Estimation for Indoor and Outdoor Operation with a Micro-Aerial Vehicle," International Symposium on Experimental Robotics (ISER) pp. 1-15 (2012).
Ayanian et al., "Decentralized multirobot control in partially known environments with dynamic task reassignment," IFAC Workshop on Distributed Estimation and Control in Networked Systems, Santa Barbara, CA, pp. 311-316 (Sep. 2012).
Trawny et al., "Cooperative multi-robot localization under communication constraints," IEEE International Conference on Robotics and Automation, Kobe, Japan, pp. 4394-4400 (May 2009).
Kloder et al., "Path planning for permutation-invariant multirobot formations," IEEE Transactions on Robotics, vol. 22, No. 4, pp. 650-665 (Aug. 2006).
Howard et al., "Multi-robot mapping using manifold representations," IEEE International Conference on Robotics and Automation, New Orleans, Louisiana, pp. 4198-4203 (Apr. 2004).
Lowe, "Distinctive image features from scale-invariant keypoints," International Journal of Computer Vision, vol. 60, No. 2, pp. 91-110 (2004).
Ansar et al., "Linear pose estimation from points or lines," IEEE Transactions on Pattern Analysis and Machine Intelligence, vol. 25, No. 5, pp. 1-12 (Apr. 2003).
Letter Regarding Decision to Grant for Chinese Application No. 201380034947.8 (dated Jun. 2, 2017).
Notification of Transmittal of the International Search Report and the Written Opinion of the International Searching Authority, or the Declaration for International Application No. PCT/US16/51313 (dated May 19, 2017).
Non-Final Office Action for U.S. Appl. No. 15/165,846 (dated Feb. 23, 2017).
Letter regarding the second Office Action for Chinese Patent Application No. 201380034947.8 (dated Jan. 26, 2017).
Notice of Acceptance for Australian Patent Application No. 2013293507 (dated Nov. 30, 2016).
Turpin et al., "Trajectory Design and Control for Aggressive Formation Flight with Quadrotors," Autonomous Robots, vol. 33, pp. 143-156 (Feb. 10, 2012).
Oh, "Multisensor Fusion for Autonomous UAV Navigation Based on the Unscented Kalman Filter with Sequential Measurement Updates," IEEE International Conference on Multisensor Fusion and Integration for Intelligent Systems, pp. 217-222 (Sep. 2010).

\* cited by examiner

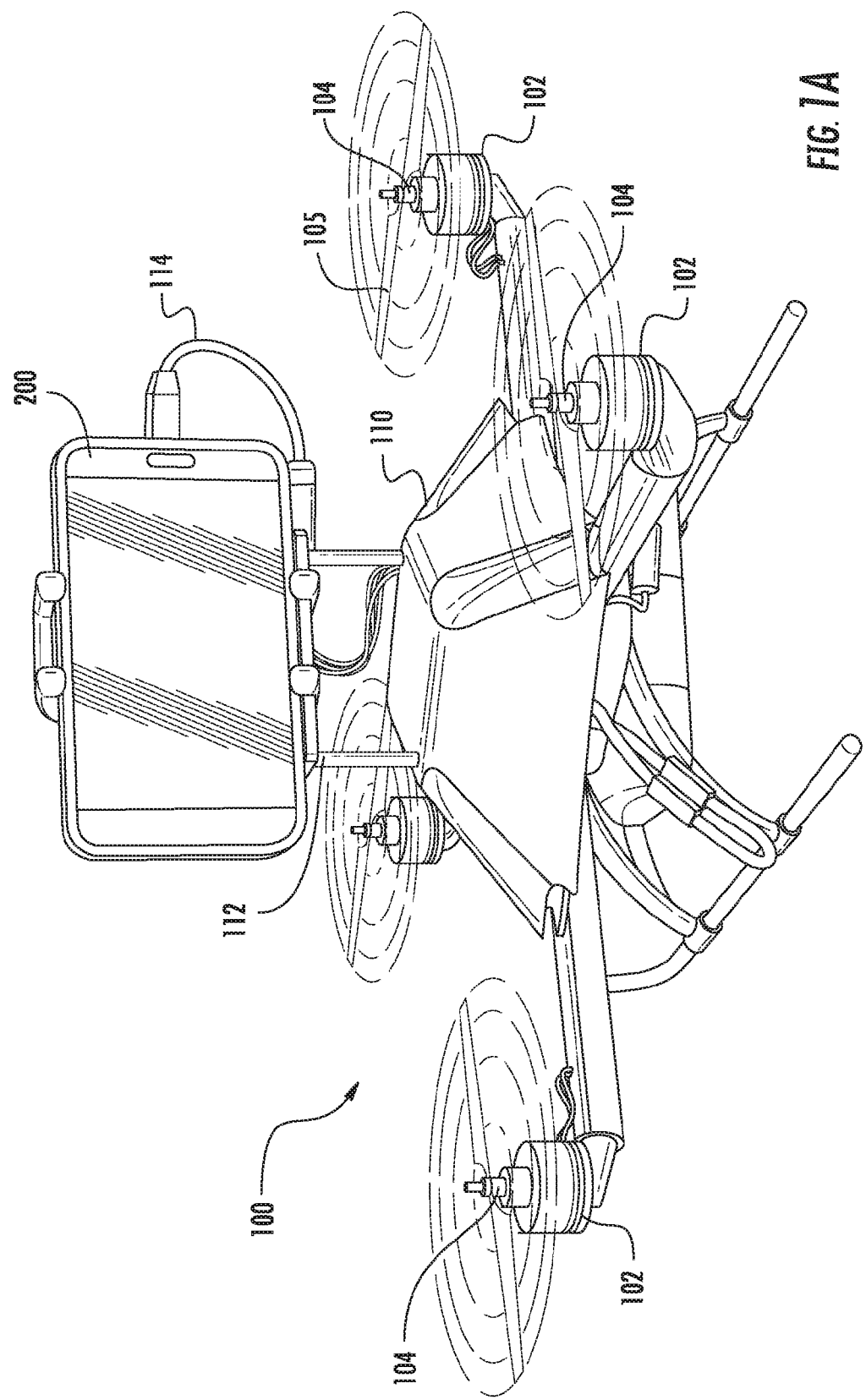

SYSTEMS, DEVICES, AND METHODS FOR ON-BOARD SENSING AND CONTROL OF MICRO AERIAL VEHICLES

PRIORITY CLAIM

The present application claims the benefit of U.S. Patent Application Ser. No. 62/196,762, filed Jul. 24, 2015, the disclosure of which is incorporated herein by reference in its entirety.

GOVERNMENT INTEREST

The presently disclosed subject matter was made with U.S. Government support under Grant No. W911NF-08-2-0004 awarded by the Army Research Laboratory and under Grant No. N00014-09-1-1051 awarded by the Office of Naval Research. Thus, the U.S. Government has certain rights in the presently disclosed subject matter.

TECHNICAL FIELD

The subject matter disclosed herein relates generally to systems, devices, and methods for on-board sensing and control of micro aerial vehicles.

BACKGROUND

Micro aerial vehicles (MAVs) and other robotic vehicles equipped with on-board sensors are ideal platforms for autonomous navigation in complex and confined environments for solving tasks such as exploration, inspection, mapping, interaction with the environment, search and rescue, and other similar applications. While MAVs are now available as off-the shelf products from a number of companies, most products rely on GPS, with vision and acoustic sensors used only for altitude stabilization.

However, recent research on MAVs has yielded a number of significant results. There are a number of Simultaneous Localization and Mapping (SLAM) approaches for MAVs. Good results have been obtained using monocular cameras and IMUs (inertial measurements units consisting of gyroscope and accelerometer), stereo camera configurations, and RGB-D sensor systems. In some implementations, for example, a Kinect and the vehicles onboard sensors are used to perform state estimation using an extended Kalman filter (EKF), while in other configurations, the same filter is used to combine monocular visual information with inertial sensor data to solve the scale factor problem. Despite these developments, though, these algorithms generally only work without limitation on laptop or desktop computers, which greatly curtails the range of possible implementations.

Moreover, RGB-D sensors have low quality cameras and suffer during exposure to direct sunlight. The minimal sensor suite for autonomous localization consists of two inexpensive, lightweight and widely available sensors, a single camera, and an IMU, including theoretical observability analysis and applied to aerial navigation. However, most solutions are heavy and over 1 kg in mass. Second, there is still a gap between the use of complex algorithms in the research field and its use by naive humans for everyday applications.

SUMMARY

In accordance with this disclosure, systems, devices, and methods for on-board sensing and control of robotic vehicles (e.g., MAVs) using commercial off-the-shelf hand-held electronic devices as a sensing and control system are provided. In one aspect, a system for controlling a micro aerial vehicle is provided. The system may include one or more sensors, a state estimation module in communication with the one or more sensors, the state estimation module being configured to generate an estimated pose of the micro aerial vehicle based on inputs from the one or more sensors, and a position controller in communication with the state estimation module and configured to communicate attitude commands to an attitude controller of the micro aerial vehicle. Each of the one or more sensors, the state estimation module, and the position controller may be contained in a commercial off-the-shelf hand-held electronic device that is configured to be coupled to the micro aerial vehicle.

In another aspect, a method for controlling a micro aerial vehicle using a commercial off-the-shelf hand-held electronic device is provided. The method may include steps of receiving inputs from one or more sensors in the commercial off-the-shelf hand-held electronic device, generating an estimated pose of the micro aerial vehicle based on the inputs from the one or more sensors, generating attitude commands based on the estimated pose of the micro aerial vehicle, and communicating the attitude commands to an attitude controller of the micro aerial vehicle. In addition, the steps of receiving inputs, generating an estimated pose, and generating attitude commands may all performed on the commercial off-the-shelf hand-held electronic device.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIGS. 1A and 1B are perspective side views of a micro aerial vehicle incorporating a commercial off-the-shelf hand-held electronic device as its sensing and control system according to an embodiment of the presently disclosed subject matter;

DETAILED DESCRIPTION

In contrast to the shortcomings of on-board control and sensor suites used in conventional micro aerial vehicles, the price/performance ratio of sensors and processors in consumer grade technology seen in cameras and phones has fallen dramatically over the last decade. In particular, most commercial off-the-shelf (COTS) hand-held electronic products like smartphones are packaged with high-resolution cameras, gyroscopes, and accelerometers, all of which may be useful as sensors for aerial robotics. In addition, the low mass and small form factor of such consumer-grade electronics make them particularly well suited for autonomous flight with small flying robots, especially in GPS-denied environments. In this way, micro aerial vehicles may be stabilized and controlled to achieve autonomous flight in indoor buildings with application to smart homes, search and rescue, construction, and architecture. Such vehicles may thus allow a consumer to combine a commercially available robot platform (e.g., a quadrotor) with a COTS hand-held electronic product, download an app, and autonomously drive the robot without GPS and build 3-D maps.

Figure 1B:
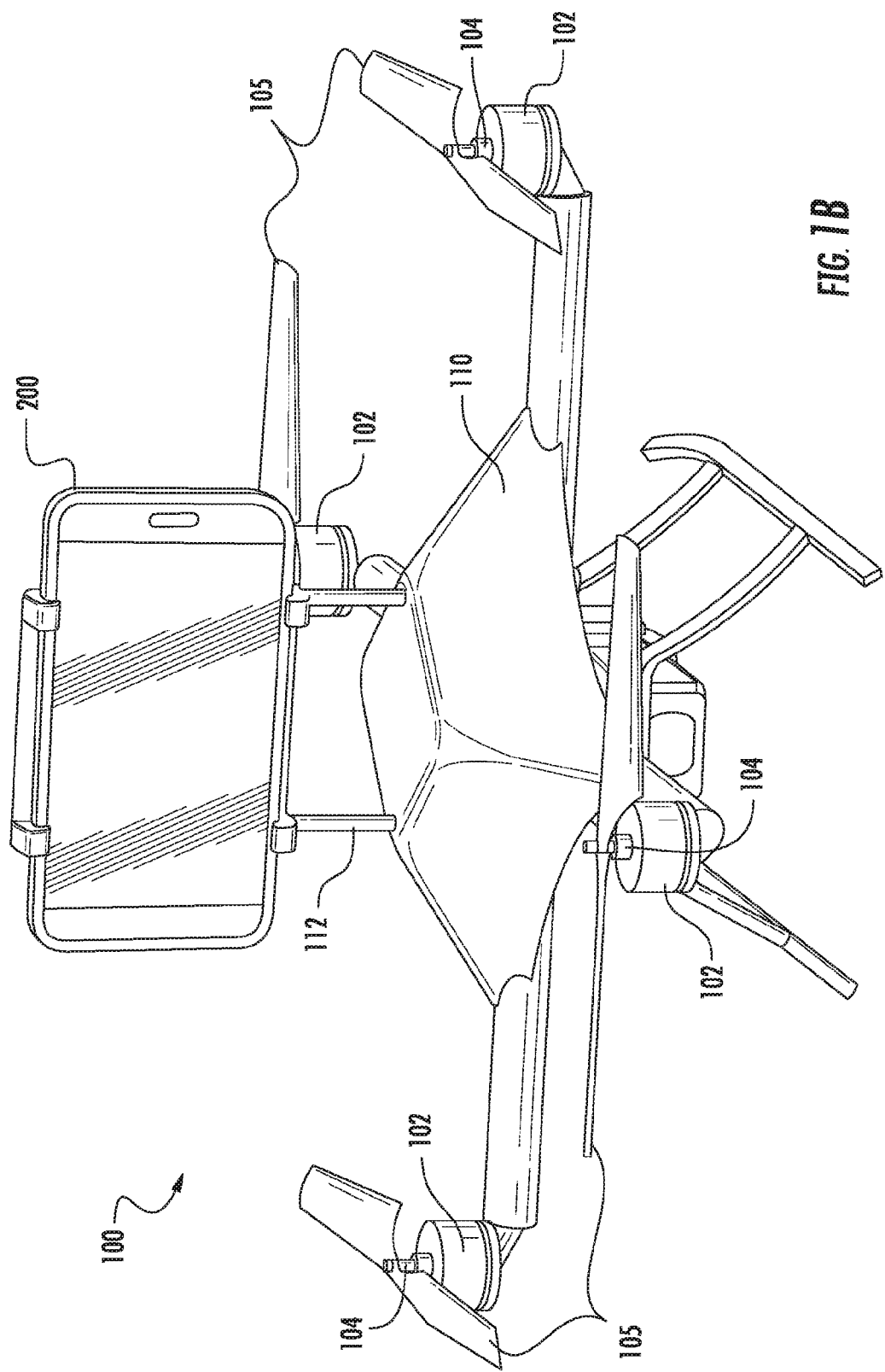

Accordingly, the present subject matter provides fully autonomous vehicles into which such commercial off-the-shelf hand-held electronic products are integrated as the control and sensor suite. Specifically, in one aspect, the present subject matter provides a system for controlling a micro aerial vehicle with a commercial off-the-shelf electronic product. For example, FIGS. 1A and 1B both illustrate systems in which an off-the-shelf micro aerial vehicle, generally designated 100, is coupled to a hand-held electronic product 200 (e.g., a smartphone). In these embodiments, micro aerial vehicle 100 has a configuration of a conventional quadrotor platform made from carbon fiber commercial off-the-shelf components and is equipped with four brushless motors 102 that are arranged about a housing 110 and that are each configured to drive a corresponding one of four rotors 104 and associated propellers 105. Micro aerial vehicle 100 being a quadrotor has advantages of mechanical simplicity and ease of control. Moreover, its ability to operate in confined spaces, hover at any given point in space, and perch or land on a flat surface makes it a very attractive aerial platform with tremendous potential.

Housing 110 is configured to surround a control component 120 (e.g., an AutoPilot board) that is configured to control the operation of motors 102. In this regard, control component 120 may include any of a variety of components, including one or more transceivers, power regulators, and motor drivers. In addition, in some embodiments, control component 120 comprises an IMU (e.g., an InvenSense MPU-6050) and a user-programmable microcontroller (e.g., a ARM microcontroller), although the functions of these components can be offloaded onto hand-held electronic component 200 in some configurations. In addition, those having skill in the art will recognize that the particular layout, size, or other configuration of control component 120 may be adapted as needed based on the desired characteristics of micro aerial vehicle 100.

Furthermore, control component 120 is designed to interface with hand-held electronic component 200, which is coupled to micro aerial vehicle 100 to provide both a sensor array and a control system for micro aerial vehicle 100. In the embodiments illustrated in FIGS. 1A and 1B, for example, hand-held electronic component 200 is mounted above housing 110 on a support structure 112. In particular, in some embodiments, support structure 112 is sized and/or otherwise configured such that hand-held electronic component 200 is spaced a distance apart from housing 110 such that the field of view of one or more of the sensors contained in hand-held electronic component 200 is substantially unobstructed by micro aerial vehicle 100 (e.g., not obstructed by the movement of rotors 104 and/or propellers 105). Alternatively, instead of being mounted above housing 110, those having ordinary skill in the art will recognize that hand-held electronic component 200 may be coupled to micro aerial vehicle 100 in any of a variety of other arrangements, such as on or below housing 110. In any arrangement, micro aerial vehicle further comprises a communications link 114 (e.g., a USB-serial cable) that provides communication between hand-held electronic component 200 and control component 120.

Regarding the particular form of hand-held electronic component 200 that is coupled to micro aerial vehicle 100, in some embodiments, hand-held electronic component 200 is a specialty device (e.g., Google Tango). In this configuration, hand-held electronic component 200 may incorporate an enhanced camera (e.g., RGB-D), which is some embodiments includes a fisheye lens that has a wide field of view (e.g., up to 170 degrees or greater). In addition, hand-held electronic component 200 may further include a high quality IMU and/or a depth sensor that is able to capture a dense set of point clouds. Such a set of specialized sensors may allow the extraction of depth and solve the scale problem that affects monocular visual odometry algorithms. In addition, the state estimation, control, and planning may be done on a second independent component (e.g., an Odroid-XU board) with additional onboard vehicle sensors.

Alternatively, in some embodiments, hand-held electronic component 200 is a commercial off-the-shelf smartphone (e.g., a Samsung Galaxy S5). As discussed above, modern smartphones commonly include high-resolution cameras, gyroscopes, and accelerometers, which can be used as a sensor array for micro aerial vehicle 100. This subject matter represents the first "plug and play" integration of a consumer product with an off-the-shelf aerial robot to enable autonomy with possible onboard localization, mapping, and control. Thus, it is representative of a new class of affordable smart devices that can potentially lower the barrier to automation into homes by providing services for localization, state estimation, control, and mapping. Any end user may be able to utilize his smartphone device to autonomously control an aerial platform and to add new functionalities.

In any configuration, the total mass of the platform may be less than about 750 g. This reduction in the mass of micro aerial vehicle 100 compared to conventional quadrotor designs is at least partially attributable to the use of hand-held electronic component 200 in place of conventional sensing and control elements. Although many of the particular embodiments discussed herein provide a particular smartphone as the control and sensor system, those having skill in the art will recognize that the configuration discussed herein is independent of the specifics of the hand-held electronic device employed.

Regardless of the particular physical configuration, hand-held electronic component 200 is configured to run some or all of the computation, sensing, and/or control of micro aerial vehicle 100. In particular, hand-held electronic component 200 incorporates software (e.g., embedded in an app) for control, planning, and tracking the full 3-dimensional motion of micro aerial vehicle 100. In addition, such a system may further be configured to concurrently create a map of the environment using visual odometry and structure from motion algorithms. Thus, in contrast to existing algorithms, which need a large platform and customized hardware processors that can be heavy and expensive, the systems and methods discussed herein provide that a commercial off-the-shelf smartphone or similar device is able to provide full autonomy for an aerial robotic platform. In addition, in some embodiments, the system uses less than 50% of the total CPU available on hand-held electronic component 200, giving the possibility to execute all the tasks on a less powerful device without limitations and/or to add other functionalities in the future.

Figure 2:
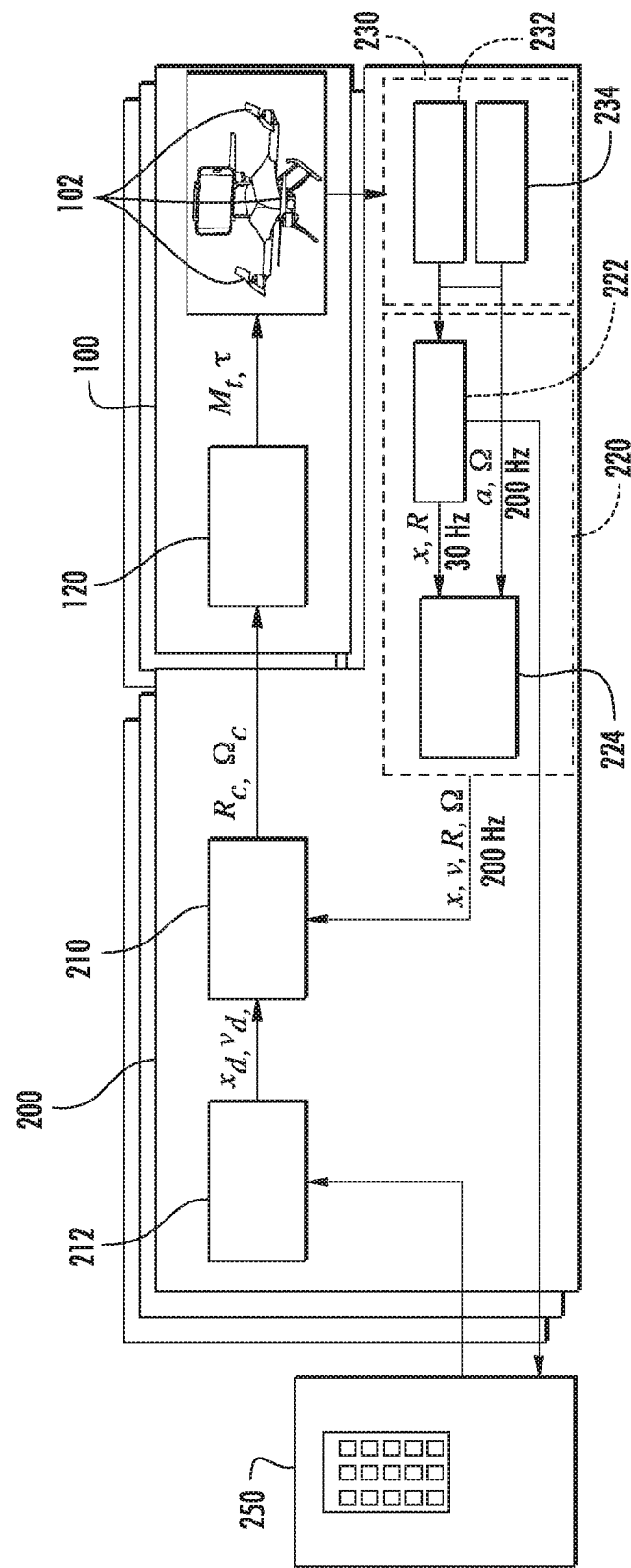
FIG. 2 is a block diagram of a control system architecture for the use of a commercial off-the-shelf hand-held electronic device as a sensing and control system for a micro aerial vehicle according to an embodiment of the presently disclosed subject matter.

Regarding the particular configuration of hand-held electronic component 200 that enables it to run some or all of the computation, sensing, and/or control of micro aerial vehicle 100, FIG. 2 illustrates a schematic representation of a sensing and control system for use with micro aerial vehicle 100. As shown in FIG. 2, the sensing and control system includes a position and attitude controller 210 and a state estimation module 220, which may include a visual inertial odometry (VIO) system 222 for processing images and an Unscented Kalman Filter (UKF) 224 configured to deal with control constraints for fast motions.

In this arrangement, VIO system 222 and UKF 224 receive inputs from one or more elements of a sensor array 230 provided on hand-held electronic component 200. In particular, for example, sensor array 230 may comprise one or more cameras 232 and/or an IMU 234, which may include one or more gyroscope and/or accelerometer. Then, position and attitude controller 210 receives the estimated pose from UKF 224 and sends the attitude commands to control component 120 on micro aerial vehicle 100. Alternatively, rather than attitude commands being processed by a separate microcontroller on micro aerial vehicle 100 (e.g., control component 120), the attitude control can be handled by the hand-held electronic product 200. As discussed above, these elements may be provided as software that runs as a single app on hand-held electronic component 200.

To provide an interaction with hand-held electronic component 200 and thus with micro aerial vehicle 100, a remote (e.g., ground station) interface device 250 may also be provided. In some embodiments, for example, interface device 250 may be a computer running a ROS-based interface. Alternatively, in some embodiments, interface device 250 may comprise a remote device (e.g., another smartphone and/or a tablet) running another app, which may be appealing for naive users. In any configuration, interface device 250 may be configured to show the reconstructed environment and/or the estimated 3D path. In particular, for example, hand-held electronic device 200 may be configured to generate sparse point clouds (e.g., as an output from VIO system 222), which can be reconstructed by interface device 250 to provide a visualization of the path of micro aerial vehicle 100.

In addition, interface device 250 may be configured to send high level commands and/or change control and flight parameters settings. In particular, for example, interface device 250 may be configured to communicated with a trajectory planner 212 on hand-held electronic component 200, which develops a planned trajectory to be navigated by micro aerial vehicle 100. This planned trajectory may then be provided as a further input to position and attitude controller 210. The communication between interface device 250 and hand-held electronic component 200 may be realized via user datagram protocol (UDP) and may be running in a separate thread to not affect estimation and control.

Regardless of the particular form of interface device 250 with which a user may interact with micro aerial vehicle 100, in some embodiments, hand-held electronic component 200 is configured such that all algorithms are run on board. In this way, interface device 250 is responsible only for visualization and/or handling user interaction. All the tasks involving navigation, control, planning, and estimation may then be executed on hand-held electronic component 200. In some embodiments, the estimation, control, and planning may be realized in separate threads to guarantee real-time reliability.

Although discussion of particular embodiments and implementations of the subject matter disclosed herein is provided below, those having ordinary skill in the art should recognize that the underlying concepts are not limited to these particular embodiments. Rather, the present subject matter can be applied to any of a variety of further configurations in which a consumer electronic device is configured to perform navigation, control, planning, and estimation with its own embedded sensors (e.g., with camera-IMU and other sensors).

System Model

Figure 3:
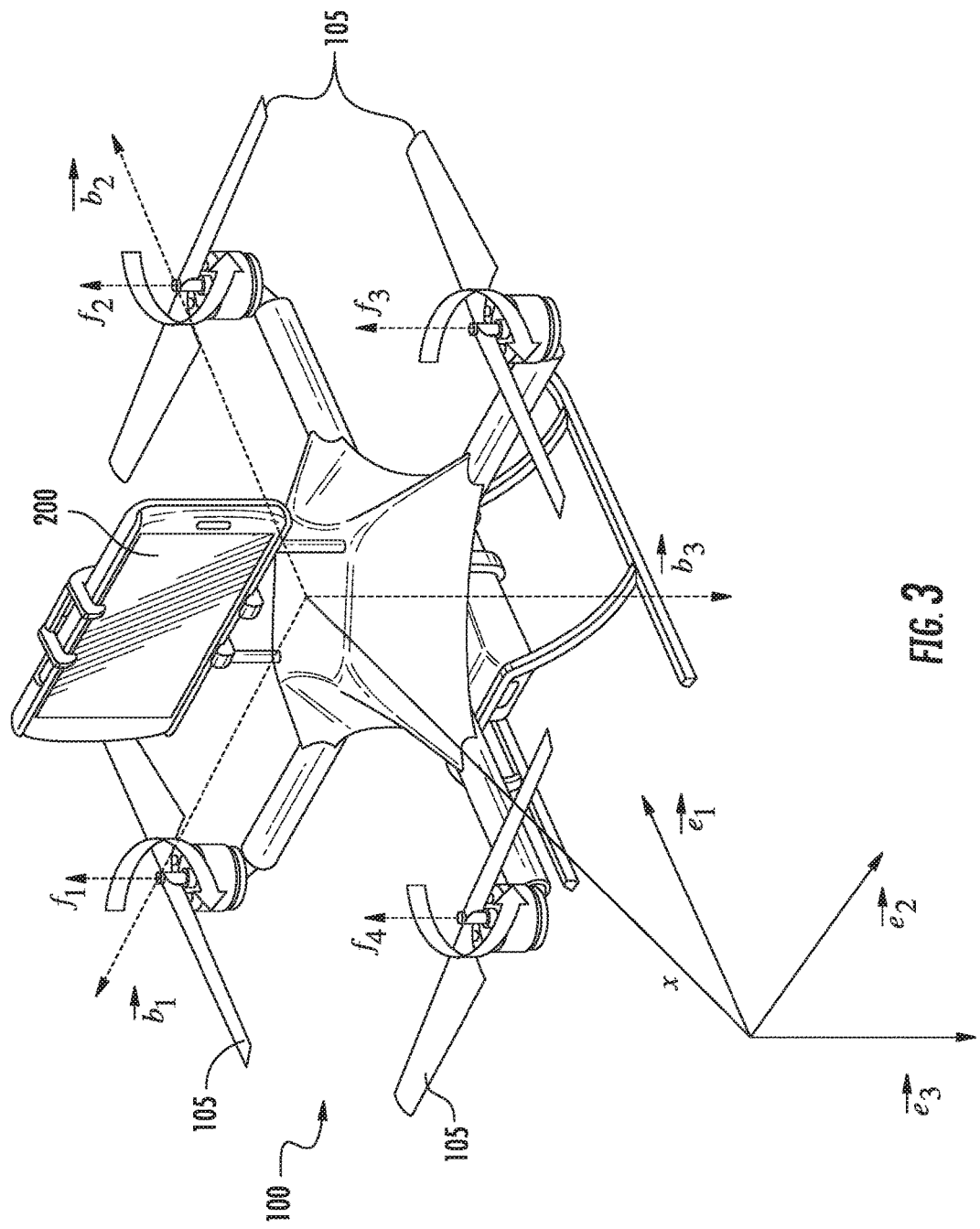
FIG. 3 is a perspective side view of a system model for a micro aerial vehicle incorporating a commercial off-the-shelf hand-held electronic device as its sensing and control system according to an embodiment of the presently disclosed subject matter.

Regarding the particular control provided for micro aerial vehicle 100, it is first useful to define the system model that governs its operation. A quadrotor is a system made of four substantially identical rotors 104 located at the vertices of a square. The first and third propeller rotate clockwise, the second and fourth propeller rotate counterclockwise. (See, e.g., FIG. 3) As illustrated in FIG. 3, for an inertial reference frame denoted by $\{\vec{e}_1; \vec{e}_2; \vec{e}_3\}$ and a body reference frame centered in the center of mass of the vehicle denoted by R=[$\vec{b}_1, \vec{b}_2, \vec{b}_3$] where R∈SO(3), the dynamic model of micro aerial vehicle 100 can be expressed as follows:

$$\dot{x}=v,$$

$$m\dot{v}=-R\tau e_3+mge_3,$$

$$\dot{R}=R\hat{\Omega},$$

$$J\dot{\Omega}+\Omega \times J\Omega=M, \quad (1)$$

where x∈$\mathbb{R}^3$ is the Cartesian position of the vehicle expressed in the inertial frame, v∈$\mathbb{R}^3$ is the velocity of the vehicle in the inertial frame, m∈$\mathbb{R}$ is the mass, Ω∈$\mathbb{R}^3$ is the angular velocity in the body-fixed frame and J∈$\mathbb{R}^{3\times3}$ is the inertia matrix with respect to the body frame. The hat symbol ^ denotes the skew-symmetry operator according to $\hat{x}y=x\times y$ for all x,y∈$\mathbb{R}^3$, g is the standard gravitational acceleration and $e_3=[0\ 0\ 1]^T$. The total moment M=[$M_1$ $M_2$ $M_3$]$^T$, along all axes of the body-fixed frame and the thrust τ∈$\mathbb{R}$ are control inputs of the plant. The dynamics of rotors and propellers are neglected and it is assumed that the force of each propeller is directly controlled. The total thrust, $\tau=\Sigma_{j=1}^{4} f_j$, acts in the direction of the z-axis of the body-fixed frame, which is orthogonal to the plane defined by the centers of the four propellers. The relationship between single motor force $f_j$, the total thrust τ and the total moment M can be written as follows:

$$\begin{bmatrix} \tau \\ M_1 \\ M_2 \\ M_3 \end{bmatrix} = \begin{bmatrix} 1 & 1 & 1 & 1 \\ 0 & -d & 0 & d \\ d & 0 & -d & 0 \\ -c & c & -c & c \end{bmatrix} \begin{bmatrix} f_1 \\ f_2 \\ f_3 \\ f_4 \end{bmatrix} \quad (2)$$

where c is a constant value and d is the distance from the center of mass to the center of each rotor in the $\vec{b}_1, \vec{b}_2$ plane. For non-zero values of d, the above equation (2) may be inverted. The assumption that τ and M are the inputs of the plant is therefore valid.

Based on this dynamic model, a control scheme may be developed to be performed by position and attitude controller 210. In most previous works, a back-stepping approach is used for control because the attitude dynamics can be assumed to be faster than the dynamics governing the position, and linearized controllers are used for both loops. Where it is desirable to model large excursions from the hover position for robustness, however, a nonlinear controller may be used.

In such a model, the control inputs τ, M may be chosen as follows:

$$M=-k_R e_R-k_\Omega e_\Omega+\Omega\times J\Omega-J(\hat{\Omega}R^T R_C\Omega_C-R^T R_C\dot{\Omega}_C), \quad (3)$$

$$\tau=-(-k_x e_x-k_v e_v-mge_3+m\ddot{x}_d)\cdot Re_3, \quad (4)$$

where $\ddot{x}_d$ is the desired acceleration, g is the gravity acceleration, $k_x$, $k_v$, $k_R$, $k_\Omega$ are positive definite terms. The subscript C denotes a command value, and the orientation and angular rate errors are represented by the following quantities:

$$e_R = \frac{1}{2}(R_C R - R^T R_C)^V \quad (5)$$

and $$e_\Omega = \Omega - R^T R_C \Omega_C,$$

while translation errors may be represented by the following:

$$e_x=x-x_d \text{ and } e_v=\dot{x}-\dot{x}_d, \quad (6)$$

where the symbol V represents the vee map $\mathfrak{so}(3)\rightarrow\mathbb{R}^3$, which is the inverse of the operation denoted by the symbol ^. If the initial attitude error is less than 90°, the zero equilibrium of the tracking errors is exponentially stable (i.e., [$e_x$; $e_v$; $e_\Omega$; $e_R$]≡[0; 0; 0; 0]). Further, if the initial attitude error is between 90° and 180°, then the zero equilibrium of the tracking errors is almost globally exponentially attractive.

State Estimation

With this model, a 6-degree-of-freedom pose of micro aerial vehicle 100 in the inertial frame is defined, which is used to control micro aerial vehicle 100. The subscripts c, b, and s denote the camera, body, and inertial frame, respectively, while a and g denote accelerometer and gyros quantities. Without loss of generality, in the following, the body frame defined above is coincident with the IMU frame. The symbol $R_{bc}$ denotes the orientation of frame c with respect to frame b.

A. Visual Inertial Odometry

Although previous work has been done on implementing vision based algorithms on camera phones, many of these algorithms rely on marker tracking and/or localization algorithms. Although such algorithms may be considered suitable for augmented reality applications, they are not suitable to deal with long term operations and large navigation coverage areas that are desired in robotic tasks. In addition, although good results on camera phones have been obtained considering rolling shutter effects, the images in such a configuration are collected at a slower rate (e.g., about 15 Hz) and processed later. In contrast, the present subject matter is particularly designed to address these issues and achieve autonomous flight based on a phone or other similar device.

In this regard, the goal of VIO system 222 is to localize the dynamics of the body with respect to the inertial frame using the accelerometers and gyroscopes of IMU 234 as interoceptive sensors and camera 232 as an exteroceptive sensor. The navigation state vector x(t)∈$\mathbb{R}^{12}$xse(3) is defined as follows:

$$x=[x_{sb}^T\ \Theta_{sb}^T\ v_{sb}^T\ \gamma^T\ b_g^T\ b_a^T]^T, \quad (7)$$

where $x_{sb}\in\mathbb{R}^3$ denotes the vector from the origin of the inertial frame to the origin of the b frame expressed in the inertial frame, $v_{sb}$ is its time derivative, $\Theta_{sb}$ is the attitude vector in exponential coordinates, γ is the unknown gravity vector in the inertial frame, and $b_a$ and $b_g$ denote slowly changing accelerometer and gyroscope biases. Since camera 232 and IMU 234 are both contained in hand-held electronic component 200, this model assumes that the relative transformation between camera and accelerometer is known. However, with some calibration parameters, such as inertial sensor scale factor, nonorthogonality, camera-accelerometer transformation ($x_{bc},\Theta_{bc}$) are jointly estimated by appending them to the state. The kinematics of equation (7) above can be derived as follows:

$$\dot{x}_{sb} = v_{sb}, \quad (8)$$

$$\dot{R}_{sb} = R_{sb}{}^b\hat{\Omega}_{sb}, \quad (9)$$

$$\dot{v}_{sb} = a, \quad (10)$$

$$\dot{\gamma} = n_\gamma, \quad (11)$$

$$\dot{b}_g = n_{bg}, \quad (12)$$

$$\dot{a}_b = n_{ba}, \quad (13)$$

where ${}^b\Omega_{sb} = R_{bg}\Omega_{sg}$ is the angular velocity of the body frame relative to the inertial, expressed in the body frame, and ($n_{bg}$, $n_{ba}$, $n_\gamma$) denotes the random walk parameters for biases and gravity.

The inputs to the dynamic system (a, ${}^b\Omega_{sb}$ are as follows:

$$y_a = A_a R_{sb}{}^T(y_a - b_a - n_a) + \gamma, \quad (14)$$

$$y_g = A_g \Omega_{sg} + b_g + n_g, \quad (15)$$

where a(t) denotes the acceleration of the body relative in the inertial frame, $\Omega_{sg}$ denotes the angular velocity of the gyroscope relative to the inertial frame (expressed in the IMU frame), $n_a$ and $n_g$ denote additive sensor noise and $A_a$ and $A_g$ characterize the effects of non-unit scale and nonorthogonality of the sensor axes. Errors in a mechanization of Equations (8) and (13) grow in an unbounded fashion, necessitating integration of sensor with bounded errors. In other words, even a tiny drift rate in the gyros results in a slowly growing tilt error. (i.e., The horizontal acceleration error is 9.8 m/s² times the tilt error in radians. Double integrating this increasing acceleration error produces a position error which grows cubically in time) Thus, while small inertial sensors can maintain accuracy of a few millimeters for one second, the drift will be hundreds of meters after just a minute or so.

To address this drift, VIO system 222 is used to update the state estimate by referencing the absolute position and orientation of micro aerial vehicle 100 (i.e., as observed by camera 232). In the past decade, camera measurements have been effectively used to aid Inertial Navigation Systems. It is assumed that the world is populated with several distinguishable features that can be easily tracked over time using a camera. If $T_f^T(t) = [x\ y\ z]$ denotes the vector to the feature in the camera frame at time t, the measurement of the camera (normalizing for its intrinsic parameters) is given by the standard perspective projection model:

$$y_c = \frac{1}{z}\begin{bmatrix} x \\ y \end{bmatrix} + n_c, \quad (18)$$

where $n_c$ is pixel measurement noise.

Figure 4:
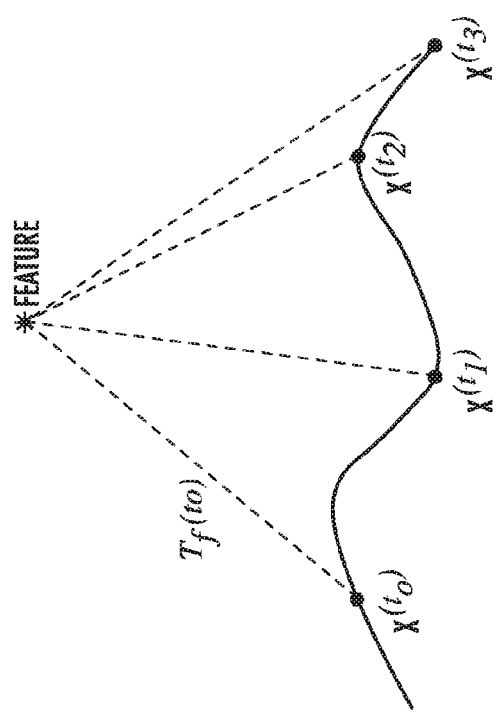
FIG. 4 is a graph illustrating observations of a stationary feature at multiple time instants according to an embodiment of the presently disclosed subject matter.

For example, as illustrated in FIG. 4, if a feature f is tracked at each $t_i$, i=0, . . . 3, then the camera measurements $y_c(t_i)$ of the feature provide constraints on the states $x(t_i)$ during that interval. Let F denote the integral function corresponding to Equations (8) and (13) such that $$x(t_i) = F(x(t_0), u, t_i), \quad (19)$$

where u is the set of all inertial measurements in ($t_0$, ti). In this way, estimates for $\tilde{x}(t_i)$ may be computed that minimize some cost function $\mathcal{L}(y_c(t_i), x(t_i), T_f(t_0))$ subject to $\|x(t_i) - F(x(t_0), u, t_i)\|_{P_i} < \lambda$ where $P_i$ is a positive definite matrix and $\lambda > 0$. In the disclosed implementation, it is assumed that the sensor measurement noises and random walk parameters are Gaussian distributed. Linearizing F around a nominal trajectory $\tilde{x}(t_i)$, we derive the linearized error state integration in the form $$\delta x(t_i) = \Phi_i \delta x(t_0) + \Psi \delta u, \quad (20)$$

where $$\Phi_i = \frac{dF}{dx}$$

and $$\Psi = \frac{dF}{du}.$$

Using equation (20) and the Gaussian noise assumption, the optimization is solved adaptively in error state domain as a Maximum-A-Posteriori estimator leading to the well known Extended Kalman Filter updates.

If the stationary feature is found to be persistent (e.g., a point tracked at the end of a corridor while navigating towards it), then the feature vector may be augmented along with the pose of the body frame at which it was first observed to the state x in order to correctly account for correlations of errors in subsequent measurements of the feature to errors in the state vector. For example, if it is assumed that features $T_{f_1}(t_1)$, $T_{f_1}(t_2)$ (which were first observed in frames $c(t_1)$ and $c(t_2)$ respectively) are tracked, then the augmented state vector $x_{aug}(t)$ at some $t \geq t_1, t_2$ would be as follows:

$$x_{aug}{}^T(t) = [x^T(t)\ x_{sb}{}^T(t_1)\ \Theta_{sb}{}^T(t_1)\ x_{sb}{}^T(t_2)\ \ldots\ \Theta_{sb}{}^T(t_2)$$
$$T_{f_1}{}^T(t_1)\ T_{f_1}{}^T(t_2)]$$

The measurements $y_c(t)$ of features $f_1$ and $f_2$ at time instant t would be used to compute an estimate of $x_{aug}$ as follows:

$$\tilde{x}_{aug}(t) = \arg\min_{x_{aug}} \mathcal{L}(y_c(t), x_{aug}(t)),$$

subject to the dynamical constraints imposed by Equation (19)

B. Unscented Kalman Filter

To enable onboard control, a second estimator is used to estimate the full state of the vehicle at a high rate (e.g., at 200 Hz). As discussed above, state estimation module 220 may include UKF 224 for this purpose. In the disclosed embodiments, an UKF is used instead of an extended Kalman filter (EKF) because of the desire to operate over a large operating envelope with significant excursions in roll and pitch angles from the hover configuration and relatively high velocities (e.g., up to 3 m/s). The state of micro aerial vehicle 100 is estimated by combining the 6-DOF pose from VIO system 222 with the measurements from IMU 234. In the model, the state is represented by the following:

$$x_f = [x^T\ v^T\ \Phi^T\ b_a{}^T]^T, \quad (21)$$

where x and v have been defined above and the quaternion is represented by the following vector:

$$\Phi = [q_0\ q_1\ q_2\ q_3]^T, \quad (22)$$

and the accelerometer biases by the following:

$$b_a = [b_{a_x}\ b_{a_y}\ b_{a_z}]^T. \quad (23)$$

The prediction step uses the input linear acceleration and angular velocity measurements given by IMU 234:

$$u_f = [\Omega^T\ a^T]^T,\ n = [n_\Omega{}^T\ n_a{}^T\ n_b{}^T]^T,\ \dot{x}_f = f(x_f(t), u_f(t), n), \quad (24)$$

where n represents the process noise that we assume to be Gaussian white noise.

Finally, the pose estimates from VIO system 222 are used to update the state estimate. A linear measurement model is thus defined according to the following relationship:

$$z_j(t) = Hx_j(t) + \eta, \qquad (25)$$

where η is the observation noise, which is again assumed to be Gaussian white noise. The measurement model is linear since the update to the state estimate developed by UKF 224 is given by the absolute position and orientation of micro aerial vehicle 100.

Figure 5:
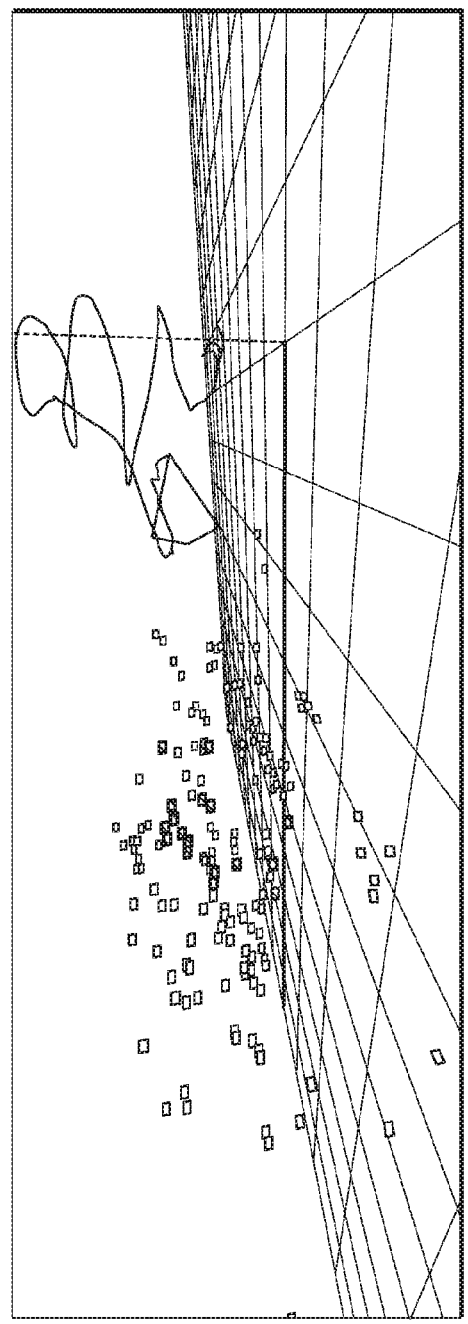
FIG. 5 is a graph illustrating a point cloud from a VIO system generated according to an embodiment of the presently disclosed subject matter.

In some embodiments, there can be a measurement delay where the rate at which VIO 222 is able to process images (e.g., at about 30 Hz) is different than a rate at which it is desired for state estimation and control to be updated (e.g., at about 200 Hz) to enable fast motions. With the present systems and methods, this delay is taken into account by buffering the values from IMU 234 until a new measurement from the algorithm of VIO system 222 is provided. Then, all the stored measurements from IMU 234 that are older than the current measurement in VIO system 222 are used as gain in the prediction step. The separation of VIO system 222 and UKF 234 is useful to keep the CPU usage limited. The state size of the VIO algorithm is not constant since image features are part of the state. For this reason, running it considering a prediction and updates steps at 200 Hz is more expensive than 30 Hz. In this way, we can have similar performances and we can satisfy the control rate constraints.

from the state estimation approach discussed above. Results, including controller performance and a comparison of the estimation technique with respect to the Vicon motion capture system, show the precision of the estimation of the present approach during flight including the ability to handle fast motions. FIG. 5 illustrates a set of point clouds generated during a trajectory sample.

A. Step Response

Figure 6:
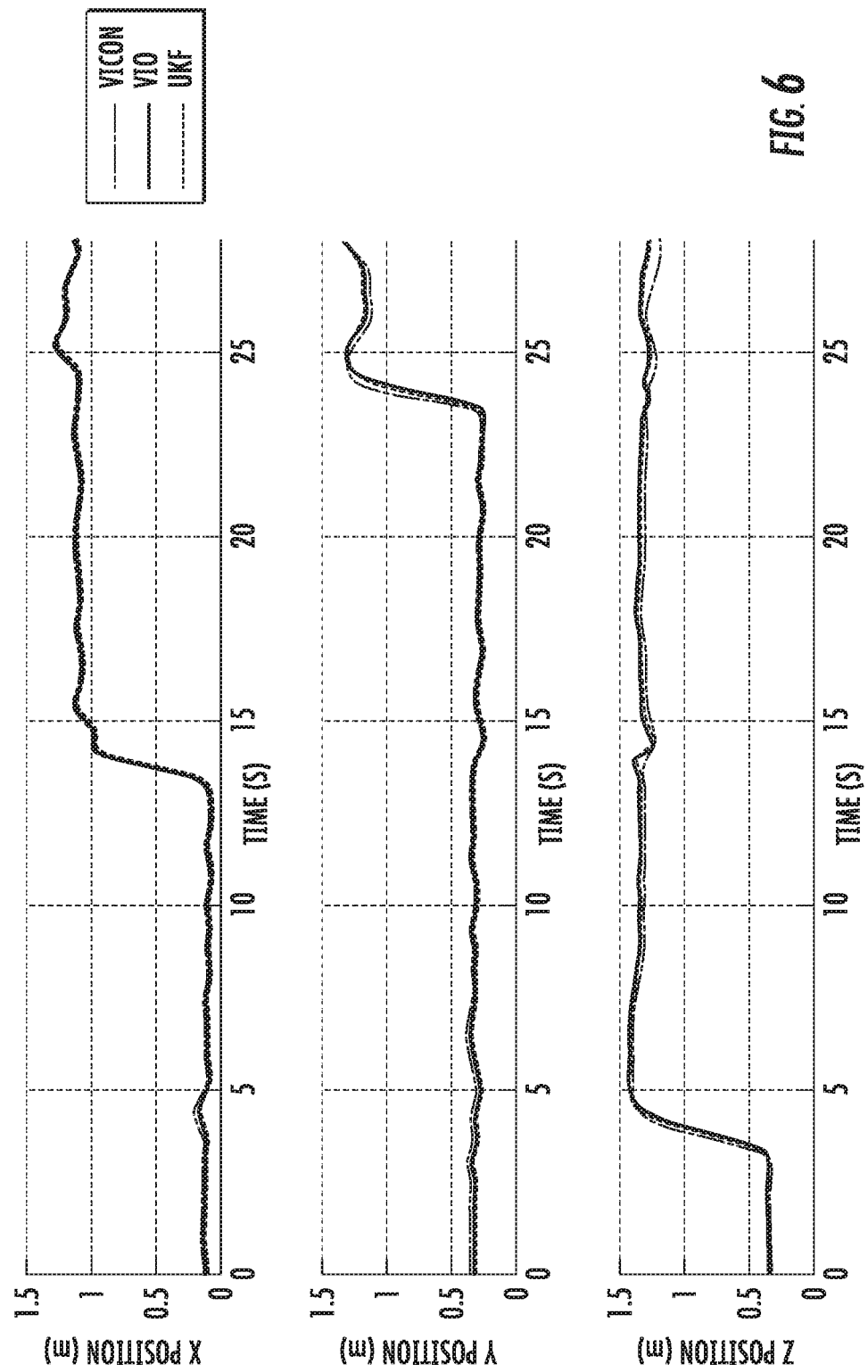
FIG. 6 is a series of graphs illustrating Cartesian 3D position of the vehicle, with Vicon data, VIO estimates, and UKF estimates generated according to an embodiment of the presently disclosed subject matter.
Figure 7:
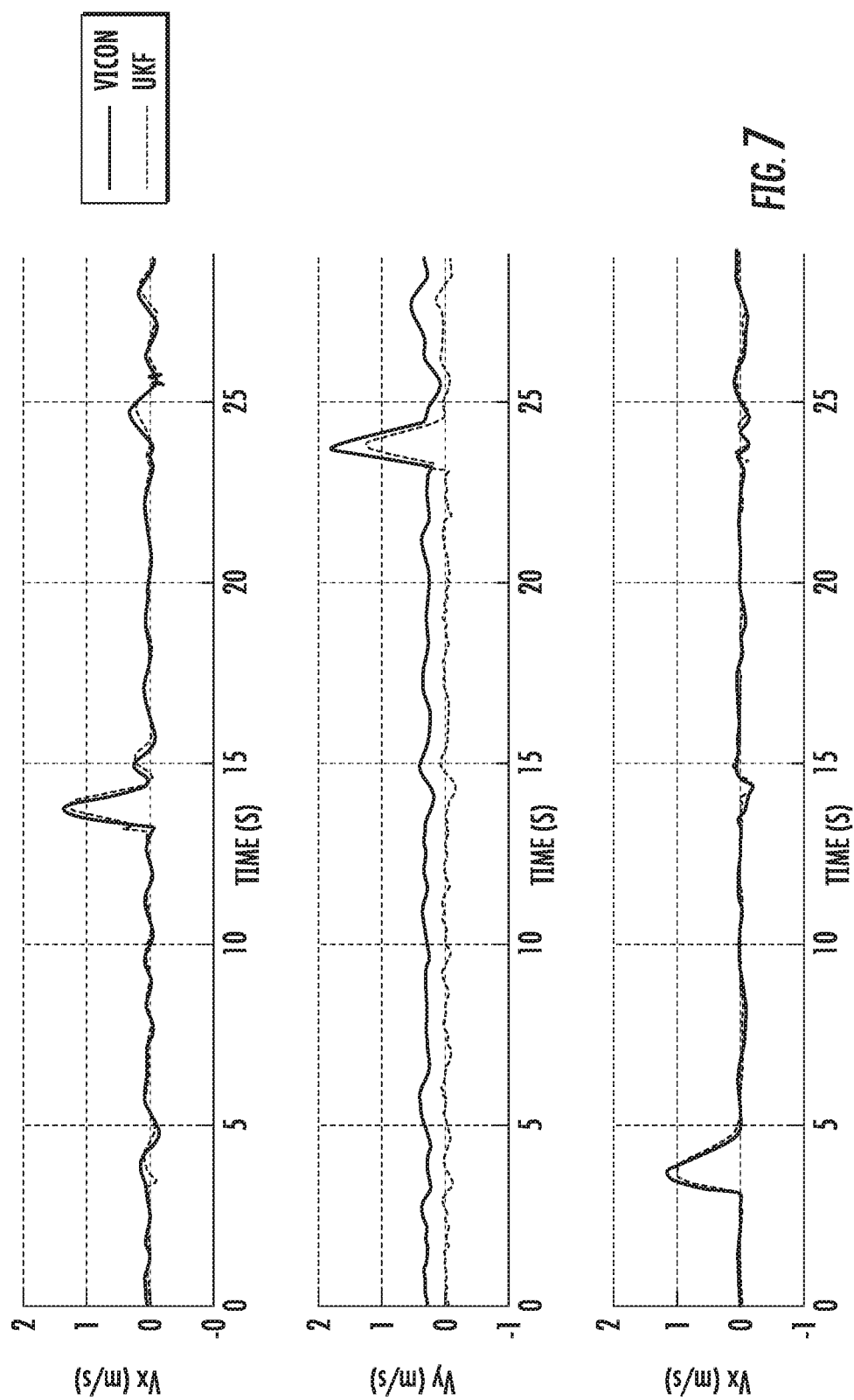
FIG. 7 is a series of graphs illustrating Cartesian velocities of the vehicle, with the Vicon data, VIO estimates, and UKF estimates.

The main purpose of this experiment is the evaluation of the controller performance in addition to the localization properties, which will be analyzed below. We propose to give three step inputs of 1 m along the three axes around at time instant 3 s, 13 s, 23 s respectively along z, x, and y axis as shown in FIGS. 6 and 7. The system employs an average of 1 s to reach the new desired value, which suggests a bandwidth of 0.25-0.5 Hz. The velocity changes accordingly on the three axes as shown in FIG. 7. It increases in the first part of the step signal and then it decreases to the 0 value such that the vehicle is able to keep the desired value in the Cartesian space. As illustrated in FIGS. 6 and 7, the estimation for position and velocity components is coherent with respect to the motion capture system, reaching velocities of 1.3 m/s. As shown in table I below, the Root Mean Square Errors (RMSE) and Standard Deviation (STD) with respect to the Vicon are reported. The average errors are 3 cm and 0.03 m/s for the position and velocity respectively, which are sufficient for autonomous navigation. Experimental results based on trajectory tracking are provided below.

TABLE I

Position and Velocity RMSE and STD of the VIO and the UKF estimates compared to Vicon for the step response.

| Certesian Component | RMSE VIO estimation (m) | RMSE UKF estimation (m) | Velocity (m/s) | STD position VIO (m) | STD position UKF (m) | STD velocity (m/s) |
|---|---|---|---|---|---|---|
| x | 0.0171 | 0.0156 | 0.0598 | 0.0155 | 0.0138 | 0.0591 |
| y | 0.0253 | 0.0237 | 0.0608 | 0.0234 | 0.0221 | 0.0608 |
| z | 0.0293 | 0.0287 | 0.0357 | 0.0251 | 0.0236 | 0.0355 |

Experimental Results

In this section we report on demonstrations at the Consumer Electronic Show (CES) 2015 and experiments that have been performed in the GRASP Lab, at The University of Pennsylvania.

The prototype shown in FIG. 1A was exhibited in CES 2015 in Las Vegas during four consecutive days with over 200 demonstrations without failures. The demonstrations were conducted against a backdrop image of Las Vegas and consists of repeated vertical lines with only a few good features. In spite of this, the system performed successfully. In each demonstration, the user starts our app on the smartphone in the conventional way, which allowed the robot to take-off, hover, track preprogrammed trajectories in a 3×2×2 m³ space before landing safely. As discussed before, the app incorporates real-time estimation, control and planning.

Figure 8:
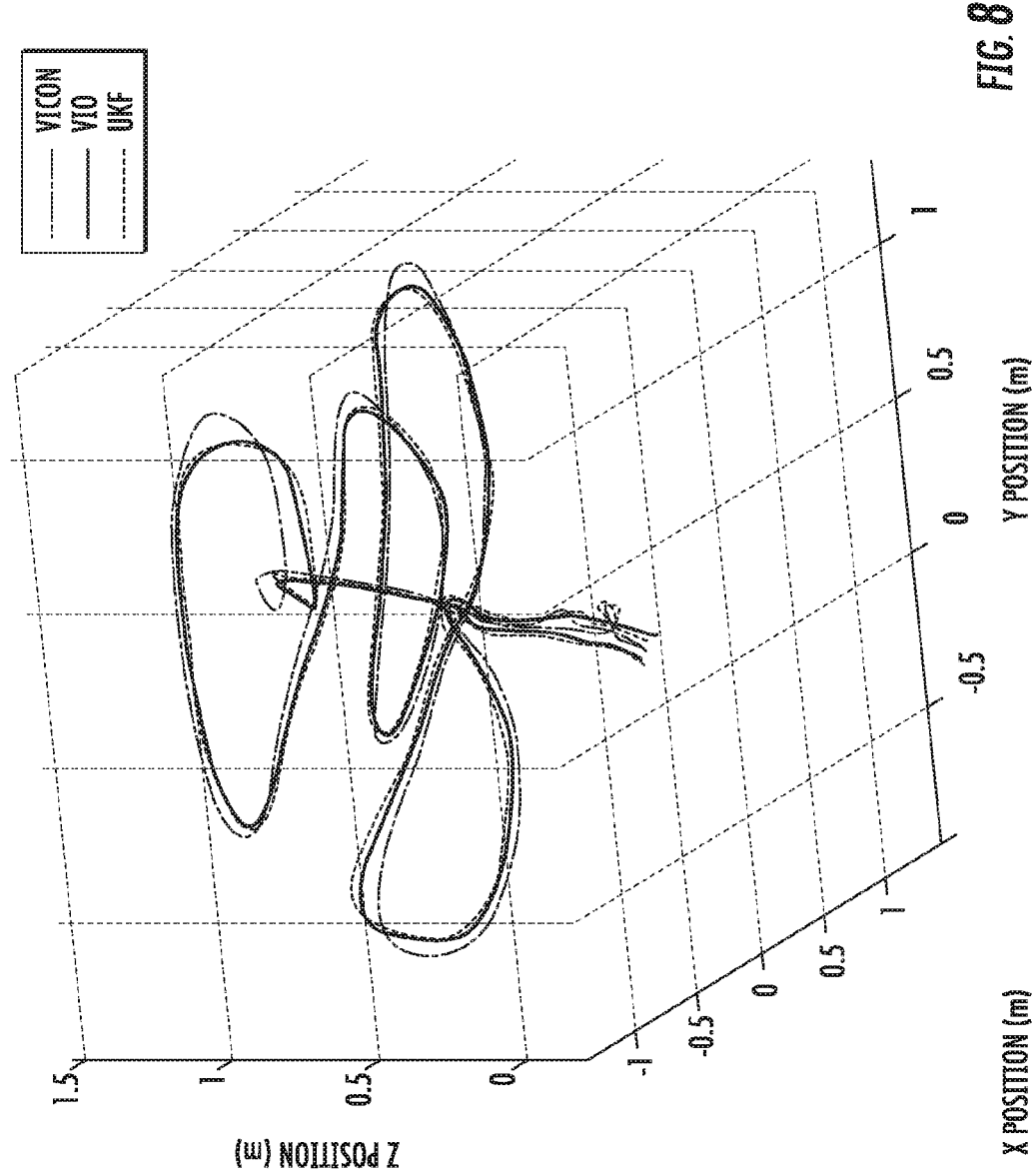
FIG. 8 is Cartesian 3D position of the vehicle, with Vicon data, VIO estimates, and UKF estimates.
Figure 9:
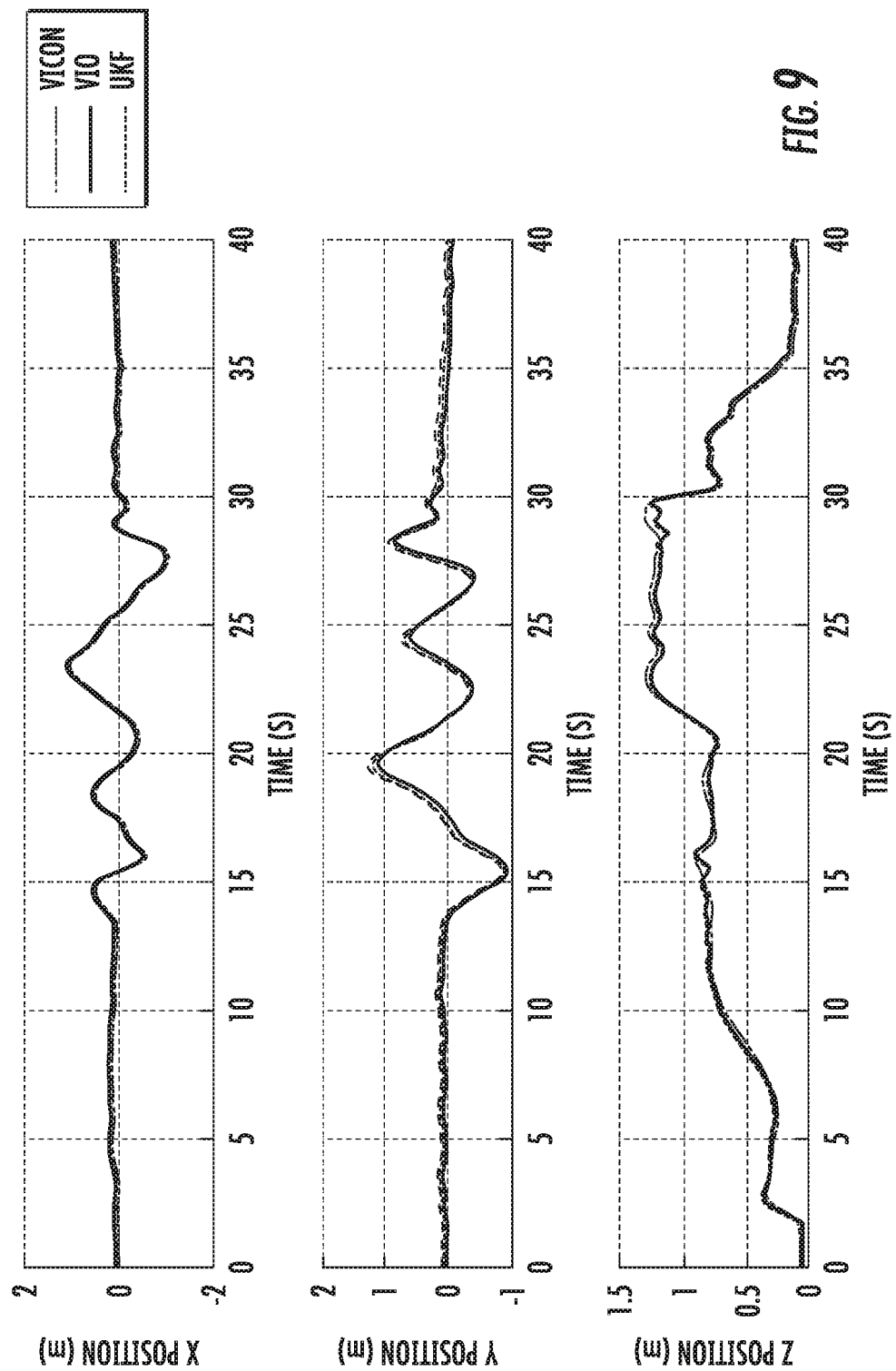
FIG. 9 is a series of graphs illustrating Cartesian positions of the vehicle with Vicon data, VIO estimates, and UKF estimates.
Figure 11:
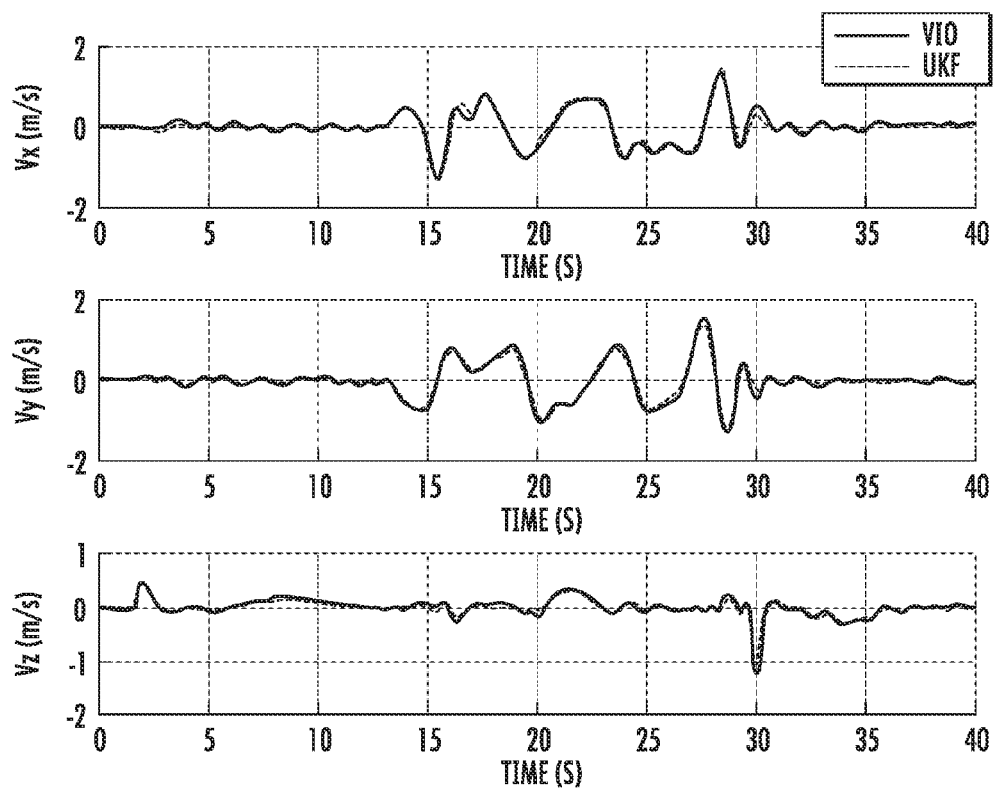
FIG. 11 is a series of graphs illustrating Cartesian velocities of the vehicle with the Vicon data and UKF estimates.

The considered working area in the GRASP Lab, is a volume of 5×4×5 m³. A Vicon motion capture system, composed of 20 T040 cameras, provides a state estimate for micro aerial vehicle 100, which is considered ground truth in this context. Two sets of tests were conducted with multiple repetitions—the first one considers the response of micro aerial vehicle 100 to step inputs. The second one is a trajectory tracking experiment to test the ability of the system to follow a trajectory in 3D space. In both experiments, the feedback control signal is obtained at 200 Hz B. Autonomous Navigation and Planning In this experiment, the system is set to follow a trajectory in 3D space to test the dynamic properties of the system. The results confirm the localization properties of the presented architecture and fully validate the proposed approach for autonomous navigation in an unknown environment. Since the input M is an algebraic function of the fourth derivative of the position (snap), it is convenient to plan smooth trajectories that minimize the snap of the trajectory using the following cost functional:

$$\min \int_{t_0}^{t_f} \mu_d \left\| \frac{d^4 x_d(t)}{dt^4} \right\|^2 dt,$$

where $\mu_d$ is a constant value and $t_0$, $t_f$ are the initial and final time, respectively. This minimization problem can be formulated as a Quadratic Program (QP). Further, equality constraints can be enforced and can be determined by desired robot positions (or velocities). The trajectory that has been designed has the shape of two figure-8 patterns at different values of the z coordinate. In fact, as shown in FIG. 8, the first figure-8 pattern is executed at the altitude of 0.7 m, while the second one at 1.2 m. The transition between the two levels is done changing the height during the pattern execution without hovering before the transition. During the descent (See, e.g., FIGS. 9 and 11), the vehicle stops and hovers. The same procedure is used during the take-off operation (see the z component in FIG. 9 between 3 s and 10 s where the vehicle takes off, then hovers till it moves to the first 8 shape). This is produced to stress and test entirely the proposed localization and control system. In these situations, the vehicle is still able to localize and keep the control running. As shown in table II below, the values of the RMSE and STD are reported for the three axis components and for both VIO estimates and UKF estimates.

TABLE II

Position and velocity RMSE and STD of the VIO estimation and of the UKF compared to Vicon at different speeds.

| Max. Velocity norm (m/s) | Cartesian Component | RMSE VIO estimation (m) | RMSE UKF estimation (m) | RMSE Velocity (m/s) | STD position VIO (m) | STD position UKF (m) | STD velocity (m/s) |
|---|---|---|---|---|---|---|---|
| 0.5 | x | 0.0265 | 0.0243 | 0.0486 | 0.0256 | 0.0230 | 0.0481 |
|  | y | 0.0277 | 0.0252 | 0.0611 | 0.0269 | 0.0243 | 0.0611 |
|  | z | 0.0255 | 0.0251 | 0.0258 | 0.0230 | 0.0230 | 0.0257 |
| 0.9 | x | 0.0339 | 0.0333 | 0.0485 | 0.0205 | 0.0182 | 0.0481 |
|  | y | 0.0326 | 0.0293 | 0.0623 | 0.0316 | 0.0283 | 0.0622 |
|  | z | 0.0306 | 0.0307 | 0.0307 | 0.0217 | 0.0215 | 0.0307 |
| 1.8 | x | 0.0238 | 0.0244 | 0.0786 | 0.0237 | 0.0244 | 0.0781 |
|  | y | 0.0336 | 0.0304 | 0.0632 | 0.0334 | 0.0302 | 0.0632 |
|  | z | 0.0278 | 0.0283 | 0.0476 | 0.0263 | 0.0268 | 0.0475 |
| 2.3 | x | 0.0716 | 0.0702 | 0.1004 | 0.0562 | 0.0534 | 0.0997 |
|  | y | 0.0467 | 0.0499 | 0.1183 | 0.0450 | 0.0484 | 0.1181 |
|  | z | 0.0336 | 0.0348 | 0.0674 | 0.0323 | 0.0334 | 0.0662 | image features to be lost and quickly re-estimated. Here as well, the system is stable and able to complete the overall task. The orientation error is evaluated as follows:

$$\Psi(R, R_d) = \frac{1}{2} tr(I - R_d^T R),$$

where R is the vehicle's rotation and $R_d$ the desired one. As shown in table III below, the orientation RMSE and STD values with respect to the motion capture system are reported. They are small and of the same magnitude.

TABLE III

Orientation RMSE and STD in radians of the VIO and the UKF estimates compared to Vicon.

| Orientation | Max. Velocity norm (m/s) | RMSE VIO estimation | RMSE UKF estimation | STD VIO | STD UKF |
|---|---|---|---|---|---|
| $\Psi(R, R_d)$ | 0.5 | $1.7888 \times 10^{-4}$ | $9.3579 \times 10^{-5}$ | $1.2384 \times 10^{-4}$ | $5.9579 \times 10^{-5}$ |
|  | 0.9 | $2.5730 \times 10^{-4}$ | $1.5755 \times 10^{-4}$ | $2.009 \times 10^{-4}$ | $1.1557 \times 10^{-4}$ |
|  | 1.8 | $6.9388 \times 10^{-4}$ | $2.1319 \times 10^{-4}$ | $6.3921 \times 10^{-4}$ | $1.8506 \times 10^{-4}$ |
|  | 2.3 | $1.2 \times 10^{-3}$ | $3.2727 \times 10^{-4}$ | $1.1 \times 10^{-3}$ | $2.8741 \times 10^{-4}$ |

Figure 10:
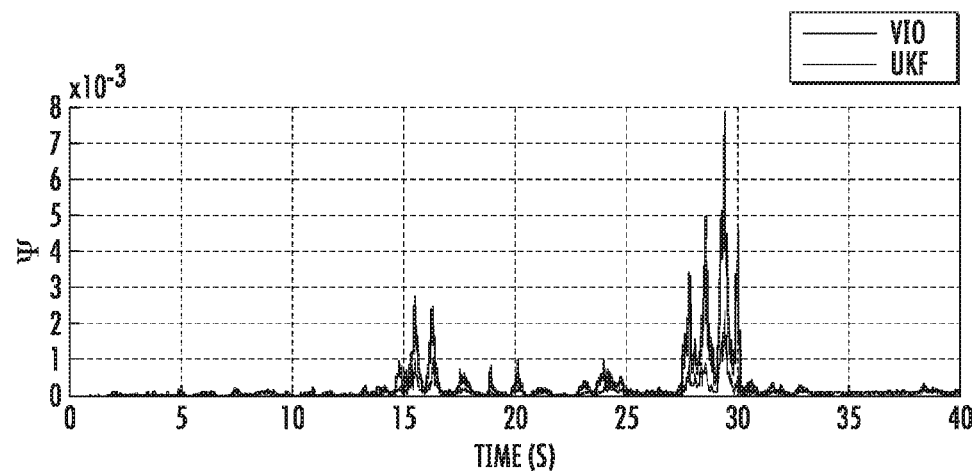
FIG. 10 is a graph of orientation error of the vehicle with respect to the motion capture system, VIO estimates, and UKF estimates.

It is noted that the filtering technique is able to keep the same values of the VIO algorithm, while increasing the rate of the localization useful for control purposes. Along the three axis the value of the errors and STD is quite similar, but the interesting aspect to notice is that the error does not fluctuate much by decreasing the trajectory time and consequently having larger maximum velocities. This demonstrate the robustness of the estimation technique and the proposed framework for control and navigation with large excursion in position (see FIG. 9 between 12 s and 30 s) and velocities up to 2 m/s during the figure-8 shape execution (see FIG. 11). A slight increase in error is apparent for the test of 2.3 m/s, but the order of magnitude is the same with respect to lower velocities. In the fastest test, the system reaches roll and pitches angles close to 30, which causes In addition, FIG. 10 illustrates the orientation error of the vehicle with respect to the motion capture system, VIO estimates, and UKF estimates.

In yet another aspect of the presently-disclosed subject matter, the concepts discussed above with respect to the present devices, systems, and methods may be applied to multiple micro aerial vehicles for operation together as a group (i.e., a swarm). This application of the present subject matter addresses three additional challenging problems for swarm of flying robots: environment mapping, autonomous navigation, and trajectory planning with multiple vehicles. In this context, it is desirable that, during the flight operations, inter-robots collision avoidance is guaranteed and that the system is agnostic with respect to interchangeability between robots. In addition, it is useful to have multiple MAVs simultaneously mapping an environment since they can collaborate in mapping tasks. The key benefits are twofold. The system is robust to single vehicle failures during the mission. Second, the environment can be covered and mapped in a faster and more reliable way than with a single vehicle. The fused map information can be exploited by every vehicle in order to make decisions, plan motions, and allocate tasks to vehicles.

Previous work has been performed on multi-robot systems focusing on MAVs. For example, it has been shown that two MAVs may map the same environment, with loop closure detection between different cameras, map merging, and concurrent map access being performed on interface device 250. In addition, a framework based on RGB-D sensors for cooperative localization and mapping has also been developed, wherein a monocular vision algorithm is used and the scale factor problem, due to the use of a single camera for localization, is solved using the depth data provided by the depth sensor. Other works use range sensors with ground robots in 2-D environments. Further, an interesting approach involves 3 synchronous cameras that are able to perform localization even considering dynamic environments. However, the images are required to be synchronized making the approach difficult to apply in the field of MAVs. All the previous works do not consider the benefits of an IMU measurement for absolute scale environment recovery, and they do not focus on the control and planning problems necessary to guarantee collision avoidance between vehicles. Conversely, other works consider the localization problems solved (this is mainly the case when an external motion capture system is used) and focus on the Concurrent Assignment and Planning of Trajectories (CAPT) with multiple vehicles. There are suboptimal approaches, which solve the CAPT problem using a centralized algorithm to create collision-free paths and solve the assignment problem for two-dimensional robots. In other approaches, centralized and decentralized solutions are presented for a N dimensional case. Other approaches analyze the scheduling and dynamic reallocation problems.

With the systems, devices, and methods discussed above for on-board sensing and control, however, a trajectory planning module is developed in which each robot is assigned to a goal location, and collision-free time parametrized trajectories are generated for multiple interchangeable vehicles. In this way, this is the first time that perception, planning, and control are combined for autonomous navigation of multiple interchangeable aerial vehicles without relying on GPS and on any external motion capture system, but just using COTS devices. To achieve this operation, some features of such a multi-vehicle system include the ability to generate time parametrized trajectories for quadrotors compatible with real time perception systems and the distribution of most of the computation load onboard each vehicle guaranteeing, at the same time, inter-vehicles collision avoidance.

Multi Vehicle Trajectory Planning

The main task of trajectory planning is, once a set of goals has been chosen, to generate trajectories that safely drive the vehicles to their corresponding locations without colliding between each other. This problem is called goal assignment and trajectories planning. Two versions of the algorithm, centralized and decentralized, have been proposed. In our case, we are interested in the centralized solution since it gives a complete solution to the problem.

A. The CAPT Problem

Let us consider N robots with radius R navigating from initial locations to M desired goal locations and suppose that the convex hull formed by the initial locations and goal locations is an obstacle free environment. The set of robots' locations and goal locations can be defined as $$X(t)=[x_1(t)^T, \ldots, x_N(t)^T]^T,$$

$$G=[g_1^T, \ldots, g_M^T]^T \quad (26)$$

It is possible to define an assignment matrix $\Phi \in \mathbb{R}^{N \times M}$, which reveals for each robot the corresponding goal location. In particular, the generic element i, j in the matrix $\Phi$ is 1 just if robot i is assigned to goal j. Clearly, the requirement is that every robot has an assigned goal which results in the following constraints:

$$\Phi^T \Phi = I \text{ if } N \geq M,$$

$$\Phi \Phi^T = I \text{ if } M < N \quad (27)$$

These constraints guarantee that each robot is assigned to a unique location in case $M \geq N$ and that there is a unique location assigned to each robot in case $N \geq M$. The problem is to find trajectories for our vehicles X(t) such that for the initial time $t_0$ and the final time $t_f$, the following constraints hold:

$$X(t_0)=[x_1(t_0)^T, \ldots, x_N(t_0)^T]^T,$$

$$\Phi^T X(t_f) = G \text{ if } N \geq M,$$

$$x(t_f) = \Phi G \text{ if } M < N \quad (28)$$

In addition, a minimum distance $\Delta(t) > 0$ may be assigned between the two centers of mass of any pair of robots during the entire trajectory:

$$\Delta(t) = \inf_{i \neq j} \|x_i(t) - x_j(t)\| - 2R \forall t \in [t_0, t_f] \quad (29)$$

The goal is to find an optimal trajectory X(t)* and $\Phi^*$ such that the sum of the following cost function is minimized:

$$\min \int_{t_0}^{t_f} \left\| \frac{dX(t)}{dt} \right\|^2 dt, \quad (30)$$

subject to Equations (27), (28), and (29)

In the original problem, first order dynamics were considered and the solution consists of straight line trajectories, which satisfy the boundary conditions while minimizing the sum of distance traveled squared. This problem is solved decomposing it in two phases, the assignment phase and the trajectory generation phase. In the first one, the Hungarian algorithm is employed to identify the association to a goal for each robot, while in the second one the trajectory is generated. The Hungarian algorithm finds the following optimal assignment solution:

$$\Phi^* = \arg \min \Sigma_{i=1}^N \Sigma_{j=1}^M \Phi_{i,j} \|x_i(t_0) - g_j\|^2, \quad (31)$$

where $\Phi_{i,j}$ indicates the elements in the assignment matrix at position i. j. Once the assignment problem is solved, the final trajectory solution is given by:

$$X(t) = (1 - \alpha(t))X(t_0) + \alpha(t)(\Phi G + (I - \Phi \Phi^T))X(t_0), \quad (32)$$

with $$\alpha(t) = \Sigma_{i=0}^k c_i t^i \text{ with } \alpha(t_0) = 0 \text{ and } \alpha(t_f) = 1.$$

If the initial and final separations are greater than $2\sqrt{2}R$, trajectories will satisfy all the constraints and they are guaranteed to be collision-free. In this work, we are interested to fly all the quadrotors at the same time so a goal location needs to be assigned to every robot N=M.

B. The CAPT Solution for a Team of Quadrotors

The previous solution gives a useful result, which can be used to plan trajectories for a team of quadrotors. Considering Equation (1), it is observed that the nominal force can be determined from the acceleration of the trajectory:

$$\tau = m\|\ddot{x} + ge_3\|, \tag{33}$$

and the orientation of the third axis of body frame, $b_3$ is:

$$b_3 = \frac{\ddot{x} + ge_3}{\|\ddot{x} + ge_3\|}. \tag{34}$$

Deriving Equation (1) again, the following relationship is obtained:

$$mx^{(3)} = -\tau \dot{R} e_3 - \dot{\tau} R e_3 = -\tau R \hat{\Omega} e_3 - \dot{\tau} b_3, \tag{35}$$

and the scalar projection onto $b_3$ reveals that $$\dot{\tau} = b_3 \cdot m x^{(3)}. \tag{36}$$

Next, the first two terms of $\Omega$ can be determined by solving Equation (35) for $\Omega e_3$ and independently projecting onto $-e_2$ and $e_1$ (note that $R^T b_i = e_i$ and, similarly, $e_i^T R^T = b_i^T$), $$\begin{bmatrix} \Omega_1 \\ \Omega_2 \end{bmatrix} = \frac{m}{\tau} \begin{bmatrix} -b_2^T \\ b_1^T \end{bmatrix} x^{(3)}. \tag{37}$$

The third term of $\Omega$ is constrained by $\psi$, the derivative of the yaw angle, one of the four flat outputs. Consider:

$$\Omega^W = \begin{bmatrix} - \\ - \\ \dot{\psi} \end{bmatrix} = R\Omega, \tag{38}$$

where $\Omega^W$ is the angular velocity of the body expressed in the world frame. Then, $\Omega_3$ can be determined using $e_3^T R \Omega$:

$$\Omega_3 = \frac{\dot{\psi} - e_3^T(b_1 \Omega_1 + b_2 \Omega_2)}{e_3^T b_3}. \tag{39}$$

The Equations (37), (39) show that angular velocity $\Omega$ is directly related to the jerk (third order derivative of the position). Vision based localization systems are generally sensitive to fast rotations. For this reason, in case of team of quadrotors, it is of our interest when planning to minimize the following cost function:

$$\min \int_{t_0}^{t_f} \left\| \frac{d^3 X(t)}{dt^3} \right\|^2 dt, \tag{40}$$

subject to Equations (27), (28), and (29).

Considering the fifth order polynomial trajectories, the corresponding path for each vehicle is given by:

$$p_j(t) = \Sigma_{i=0}^{5} c_i t^i \forall j \in [1, \ldots, N]. \tag{41}$$

The solutions are the trajectories that minimize the jerk along the straight line trajectories from the initial position to the goal location for each robot. Moreover, let us relax the constraint expressed by Equation (27) and consider homogeneous boundary conditions for velocity, acceleration, and jerk. Thus, the straight line can be parametrized as:

$$X(t) = (1 - \alpha(t)) X(t_0) + \alpha(t) X(t_f), \tag{42}$$

with $$\alpha(t) = \Sigma_{i=0}^{5} c_i t^i \text{ with } \alpha(t_0) = 0 \text{ and } \alpha(t_f) = 1.$$

The homogeneous boundary conditions imply that the integral of the jerk squared is a constant factor times the integral of the velocity. This implies that the solution of the optimization problem Equation (42) is equivalent to the solve the optimization problem expressed by Equation (30). The solution given by Equation (42) is then a solution of the previous CAPT problem. It guarantees intra-robots obstacle avoidance during the flight. It is just worth to notice that the solution given by Equation (42) is equivalent to Equation (32) for N=M. In this case, it is then possible to decouple the assignment problem from the trajectory generation one. The final time can be chosen as:

$$t_f = \max_i \left( \frac{\|x_i(t_0) - \Phi_i^{*T} G^T\|}{v_{max}} \right),$$

where $v_{max}$ is the maximum velocity that the user can choose and $\Phi_i^*$ is the ith row of the optimal assignment matrix.

C. Semi-Distributed Algorithm

The main challenge in the presented system architecture, is related to its dependence on wireless communication to execute the trajectories since the algorithm is centralized. It is complicated and often too risky to send trajectories at 200 Hz over the network. Delays in the network infrastructure may affect the closed loop control and can produce collisions between the vehicles. To avoid the stream of the entire trajectory from interface device 250, only the coefficients obtained as a solution of the previous optimization problem are sent in separate threads to each platform. This strategy allows for the safe generation of trajectories without explicitly relying on network capabilities. The 6 $c_i$ coefficients of Equation (42) in addition to the starting and goal locations, expressed in the local frame of the single robot (the reference frame for estimation and control of every single robot), are sent via wifi through the UDP protocol to each robot.

The trajectories are then generated on-board of each vehicle in a separate thread such to guarantee real-time reliability. Once the trajectories are generated, a message is sent to interface device 250 from each vehicle and a trigger guarantees to start all of them at the same time. In this context, the only reasonable assumption is that all the phones have the same clocks.

Map Merging

The planning procedure has been previously introduced with the implicit assumption that the pose of all the vehicles is perfectly known. This is true since each vehicle has its own estimation framework as mentioned above. However, due to incremental pose estimation errors, the vehicle's pose can be prone to drifts. This behavior is particularly problematic in large environments and it can affect the assignment and planning because they are based on the pose information provided by each robot. Therefore, a new estimate of the vehicle's poses needs to be periodically computed to have a consistent planning algorithm. In addition, it would be desirable to obtain a unified representation of the environment and the single maps provided by each vehicle need to be merged.

As discussed above, each vehicle is able to generate a "sparse point cloud." The feature points extracted in the environment, after a given number of measurements, are triangulated and inserted into the filter's state. Then, the 3D points are available to be used for environment reconstruction. The challenge is to enable the merging of multiple maps at the same time. In one embodiment, a set of keyframes is established on each robot and a set of SIFT descriptors is computed only for those keyframes. A predefined number of potential matching keyframe candidates between a vehicle and the common database has to be collected. A keyframe is selected if the distance of the new frame relative to all keyframes exceeds a threshold of the average scene depth. Interface device 250 implements a bag-of-word approach and when a sufficient overlap is detected between two potential keyframes, a relative transformation between is computed. The average keyframe processing time on interface device 250 is 30 ms. The descriptors are used for place recognition and the local features 3D points are used to solve a PnP problem between the overlapped keyframes. Especially useful in large environments, interface device 250 can run a full pose graph optimization thread. A pose graph optimization is preferable in this context to a full bundle adjustment since the last one is computationally demanding and may fail completely due to convergence into local minima.

We experimentally verified that every single map presents an average standard deviation with respect to a reference position of 5 cm at different distances ranging from 1 m to 10 m with very few outliers. These results show the possibility to obtain an accurate environment reconstruction just knowing the relative pose between the vehicles. It is worth noting that the presented strategy does not have strict computational requirements since interface device 250 is not involved in controlling the vehicles.

Finally, once a new pose estimate is obtained, the goal location of a robot can be corrected to guarantee that the conditions that guarantee inter-robots collision avoidance are still verified. This strategy has the additional benefit that the on-board maps and estimation pipelines do not need to be modified.

Multi-Vehicle Experimental Results

In this section, we report on the experiments that have been performed at The University of Pennsylvania with 3 quadrotor platforms. To show the performance of the presented approach, the lobby of a building (Levine Hall) is chosen to represent a neutral environment that is different from a laboratory. The considered working area is a volume of 10×6×8 m$^3$. The entire system running on the ground station (i.e., interface device 250) has been implemented in ROS and allows, as previously mentioned, the interaction with an user and the goal selection for every vehicle. The on-board phone system runs an android app.

A. Navigation of Three Quadrotors

Multiple sets of tests are used to show the performances of the proposed planning algorithm and architecture. During the flight, first, second, and third micro aerial vehicles 100a, 100b, and 100c are used to create a unified reconstruction of the environment and/or to generate specific shape configuration among first, second, and third micro aerial vehicles 100a, 100b, and 100c. In particular, it can be shown that flight with three vehicles can first generate linear motions (See, e.g., FIG. 12), then triangular shapes (See, e.g., FIG. 13), and then rotations (See, e.g., FIG. 14) in sequence.

Figure 12:
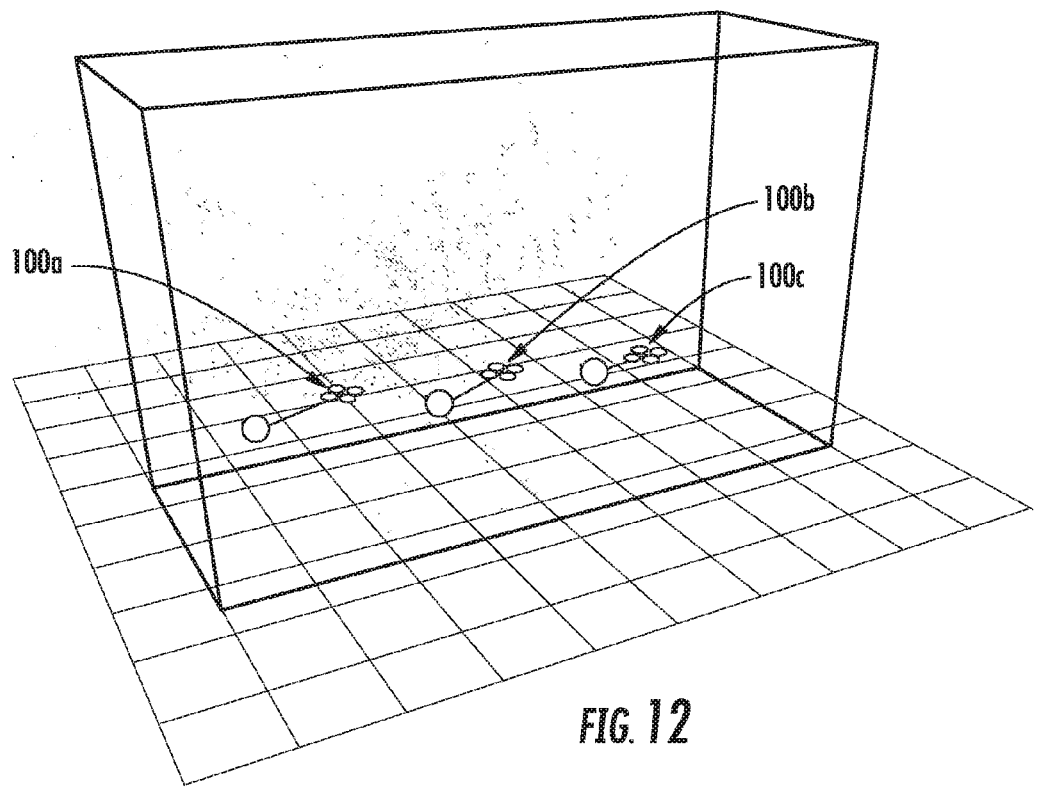
FIG. 12 is a three-dimensional reconstruction of the flight of three vehicles generating linear motions in a space according to an embodiment of the presently disclosed subject matter.
Figure 13:
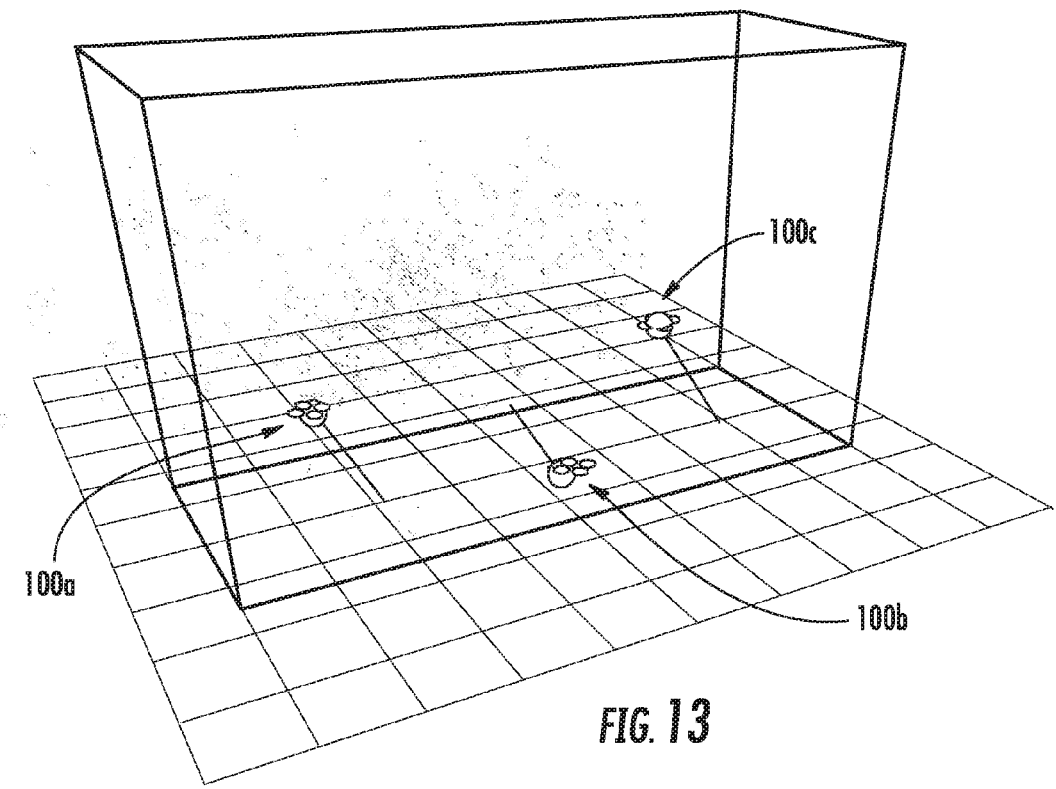
FIG. 13 is a three-dimensional reconstruction of the flight of three vehicles generating triangular shapes in a space according to an embodiment of the presently disclosed subject matter.
Figure 14:
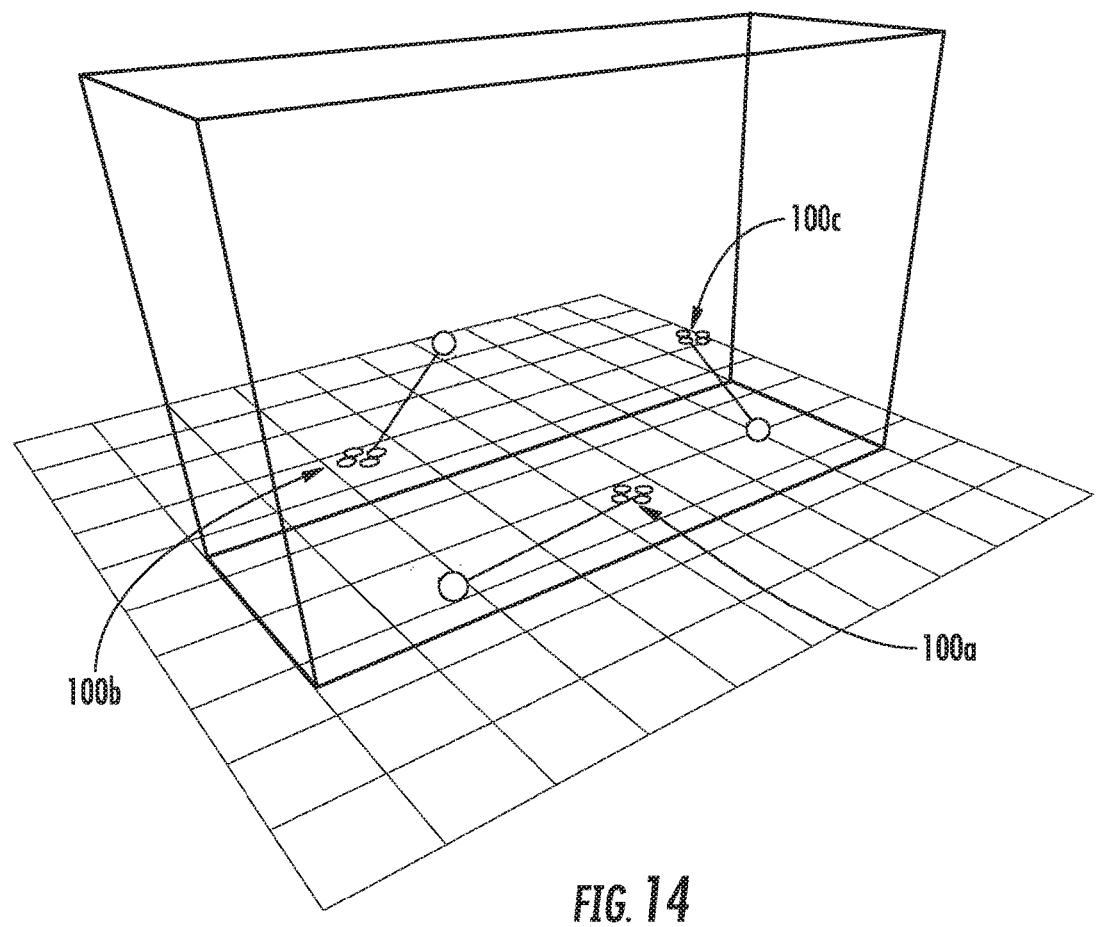
FIG. 14 is a three-dimensional reconstruction of the flight of three vehicles generating rotations in a space according to an embodiment of the presently disclosed subject matter.

As shown in the three cases, the vehicles are correctly assigned to the location minimizing the squared sum of all the distances in 3D space. The rectangular environment with black lines shown in FIGS. 12, 13, and 14 is illustrated to help a user to select the goal locations. The benefits of this strategy can be clearly noticed transitioning from the triangular shape motion (FIG. 13) to the rotation motion (FIG. 14). This confirms the correctness of the proposed approach and that the system is agnostic with respect to robots' interchangeability. Interface device 250 solves the assignment problem for 3 vehicles in 1-2 ms on a common i7 laptop. To plan trajectories at the take-off the initial position of the vehicles is assume to be known if no initial overlap is detected. It is a reasonable assumption to have an initial information since generally, when a mission starts, the vehicles' positions are known. It is worth specifying that the motions are generated continuously switching from one configuration to another. Each of them presents an average displacement of 2.5 m.

The proposed planning solution is also able to alleviate aerodynamic effects such to not impact the safety of the team. It can be enforced, considering a spherical model, that the center of mass of each pair of robots has to be at least n times the robot's radius R. This condition can be directly incorporated in the safety distance term between the center of masses expressed by Equation (29) and into the initial and final boundary conditions of the planning obtaining the same formulation. In the proposed experiments, we employ values n=5, 6. However, to further validate the proposed approach, the pipeline was also tested with two vehicles in hovering mode with the corresponding centers of mass at 1 m and 2.5 m from each other (the reader can notice that 1 m is lower than the minimum distance required by the algorithm to guarantee collision avoidance). We have experimentally verified flying autonomously, at different altitudes, that the standard deviation is less than 0.1 m as shown in table IV below. Moreover, once they are sufficiently far from each other the error is equivalent to the hovering one. Thus, the effects of disturbances are bounded and do not affect the safety of the team for n=5, 6.

TABLE IV

Average mean error and standard deviation (STD) for different distance from the ground

| COM distance (m) | Ground distance (m) | Mean (m) | STD (m) |
| --- | --- | --- | --- |
| 1 | 1 | 0.0518 | 0.0420 |
|  | 0.2 | 0.0631 | 0.0438 |
| 2.5 | 1 | 0.0204 | 0.0239 |
|  | 0.2 | 0.0282 | 0.0252 |

In this way, micro aerial vehicles 100 are able to distinguish objects from a set of point clouds, validating the strategy discussed above. We can easily identify what points belongs to feature in the environment (e.g., stairs, boxes). In addition, experimental results show that different vehicles may contribute to different parts of the environment reconstruction, with the entire space being modeled colaboratively.

B. Extension to Larger Teams

It is worth noting the scalability of the proposed approach, increasing the number of elements in the team. The proposed architecture is semi-distributed, allowing it to easily increase the number of robots since the estimation, control, and planning pipeline running on each robot is the same. The key challenges for larger teams are twofold. First, the assignment and merging problems will take a longer time to be executed. Second, to fly hundreds of vehicles, due to space constraints, it is necessary to reduce the vehicles' size to maintain a compatible flight time. Regarding the first challenge, the assignment has cubic complexity and it can be solved in less than half second for hundreds of vehicles. For the map merging, it is very difficult to predict the exact time increase, since it dependents on many factors such as scene overlaps, the type and number of descriptors employed and the environment size. However, this task, as the assignment one, is solved on the ground station, not affecting the control and can be easily enforced before the planning.

In this work, it is shown that the hardware and software architecture with the underlying algorithms enable the "plug and play" functionality with a consumer product (e.g., a smartphone) and a quadrotor. The phone is able to solve real time control constraints, planning, mapping, and estimation tasks. In particular, it has been demonstrated that the autonomous navigation of a quadrotor platform is achieved using sensors onboard a smartphone, such as a single camera and an IMU. With data from an external motion capture system used to measure ground truth, it has been demonstrated that the robot can navigate in three dimensions at average speeds of 1.5-2 m/s with an average error of 3 cm in position. The use of these devices in robotics has great potential for STEM education and for personal robots.

In addition, such systems, devices, and methods may be applied to a multi-robot system with perception capabilities, enabling environment reconstruction and preserving collision avoidance between robots during the trajectory execution tasks. The system is based on single phones running an app and performing state estimation, environment reconstruction, and control in real-time using a phone camera and an IMU. The key components are identified in the estimation, planning, and map merging algorithms. The architecture guarantees, despite the centralized properties of the planning algorithm, reliance on wireless communication only for a fraction of the entire pipeline and on-board distribution of most of the demanding capabilities. The final reconstruction shows the possibility to identify different objects in the environment.

The present subject matter may be embodied in other forms without departure from the spirit and essential characteristics thereof. The embodiments described therefore are to be considered in all respects as illustrative and not restrictive. For example, as discussed above, although particular embodiments and implementations of the subject matter are disclosed, those of ordinary skill in the art will recognize that the concept of fully autonomous vehicles into which commercial off-the-shelf hand-held electronic products are integrated as the control and sensor suite can be implemented in any of a variety of additional embodiments. Accordingly, although the present subject matter has been described in terms of certain preferred embodiments, other embodiments that are apparent to those of ordinary skill in the art are also within the scope of the present subject matter.

What is claimed is:

1. A system for controlling a micro aerial vehicle comprising:
   one or more sensors, wherein the one or more sensors comprise one or more cameras and one or more of a gyroscope and/or an accelerometer;
   a state estimation module in communication with the one or more sensors, the state estimation module comprising:
   a visual inertial odometry system in communication with the one or more cameras and the one or more of a gyroscope and/or an accelerometer; and
   an estimator in communication with the visual inertial odometry system and the one or more sensors, the estimator being configured to generate a state estimate of the micro aerial vehicle based on inputs from the one or more of a gyroscope and/or an accelerometer and to generate an estimated pose by updating the state estimate based on inputs from the visual inertial odometry system; and
   a position controller in communication with the state estimation module and configured to communicate attitude commands to an attitude controller of the micro aerial vehicle;
   wherein the state estimation module is configured to transmit the estimated pose to the position controller at a rate of about 200 Hz or greater; and
   wherein each of the one or more sensors, the state estimation module, and the position controller are contained in a hand-held electronic device that is mounted to the micro aerial vehicle.

2. The system of claim 1, wherein the estimator comprises an Unscented Kalman Filter in communication with the one or more sensors.

3. The system of claim 1, wherein the state estimation module is configured to send visualization data of the estimated pose to a remote user interface.

4. The system of claim 1, wherein the position controller comprises a nonlinear controller.

5. The system of claim 1, wherein the position controller is configured to receive trajectory planning information from a remote user interface.

6. The system of claim 1, wherein the attitude controller is contained in the hand-held electronic device.

7. A method for controlling a micro aerial vehicle using a hand-held electronic device, the method comprising:
   mounting the hand-held electronic device to the micro aerial vehicle;
   receiving inputs from one or more sensors in the hand-held electronic device, wherein the one or more sensors comprise one or more cameras and one or more of a gyroscope and/or an accelerometer;
   generating an estimated pose of the micro aerial vehicle based on the inputs from the one or more sensors, wherein generating the estimated pose comprises:
      generating a state estimate of the micro aerial vehicle based on inputs from the one or more of a gyroscope and/or an accelerometer; and
      using visual inertial odometry to localize dynamics of a body of the micro aerial vehicle with respect to an inertial frame and update the state estimate based on inputs from the one or more cameras;
   generating attitude commands based on the estimated pose of the micro aerial vehicle; and
   communicating the attitude commands to a control component of the micro aerial vehicle;
   wherein generating an estimated pose of the micro aerial vehicle comprises updating the state estimate at a rate of about 200 Hz or greater;
   wherein receiving inputs, generating an estimated pose, and generating attitude commands are all performed on the hand-held electronic device.

8. The method of claim 7, wherein generating an estimated pose comprises applying an Unscented Kalman Filter to the inputs from one or more sensors to estimate a full state of the micro aerial vehicle.

9. The method of claim 7, wherein generating attitude commands further comprises receiving trajectory planning information from a remote user interface.

10. The method of claim 7, wherein generating attitude commands further comprises coordinating a trajectory plan with at least one additional micro aerial vehicle.

11. The method of claim 10, wherein coordinating a trajectory plan comprises:
   at a remote user interface, determining a solution for a system of equations that represent straight-line trajectories of each of the micro aerial vehicle and the at least one additional micro aerial vehicle;
   sending coefficients of a respective one of the system of equations to the micro aerial vehicle; and
   generating the attitude commands based on the coefficients.

12. The method of claim 7, wherein the control component is contained in the hand-held electronic device.

13. The method of claim 7, further comprising sending visualization data of the estimated pose to a remote user interface.

14. The method of claim 13, wherein the visualization data of the estimated pose comprises point clouds.

* * * * *